(12) United States Patent
Li et al.

(10) Patent No.: US 11,469,864 B2
(45) Date of Patent: Oct. 11, 2022

(54) DATA TRANSMISSION METHOD AND APPARATUS

(71) Applicant: Huawei Technologies Co., Ltd., Shenzhen (CN)

(72) Inventors: Nijun Li, Shanghai (CN); Yuejun Wei, Shanghai (CN); Weiqiang Yang, Shanghai (CN); Ming Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/114,171

(22) Filed: Dec. 7, 2020

(65) Prior Publication Data

US 2021/0091896 A1    Mar. 25, 2021

Related U.S. Application Data

(63) Continuation of application No. PCT/CN2018/090299, filed on Jun. 7, 2018.

(51) Int. Cl.
*H04L 1/22* (2006.01)
*H04L 1/16* (2006.01)
(Continued)

(52) U.S. Cl.
CPC .............. *H04L 1/22* (2013.01); *H04L 1/1642* (2013.01); *H04W 28/06* (2013.01); *H04W 80/02* (2013.01)

(58) Field of Classification Search
CPC ........ H04L 1/22; H04L 1/1642; H04W 28/06; H04W 80/02
(Continued)

(56) References Cited

U.S. PATENT DOCUMENTS 8,090,586 B2 *    1/2012    Oh ................. G10L 19/167
                                                         704/500
2004/0160979 A1 *    8/2004    Pepin ................ H04L 1/0009
                                                         370/462
(Continued)

FOREIGN PATENT DOCUMENTS

CN    1720683 A    1/2006
CN    1787421 A    6/2006
(Continued)

OTHER PUBLICATIONS 62643541P (Year: 2018).*
(Continued)

*Primary Examiner* — Yemane Mesfin
*Assistant Examiner* — Intekhaab A Siddiquee
(74) *Attorney, Agent, or Firm* — Leydig, Voit & Mayer, Ltd.

(57) ABSTRACT

This application provides a data transmission method and apparatus. The method includes: obtaining significant bits in an $N^{th}$ data frame, where N is an integer greater than or equal to 1, a quantity of the significant bits in the $N^{th}$ data frame is smaller than a quantity of bits in the $N^{th}$ data frame, and remaining bits other than the significant bits in the $N^{th}$ data frame are insignificant bits in the $N^{th}$ data frame; and sending the significant bits in the $N^{th}$ data frame, and skipping sending the insignificant bits in the $N^{th}$ data frame. According to the application, on a premise of ensuring voice intelligibility, a transmit end apparatus transmits only the significant bits, to minimize a data transmission amount, thereby improving transmission reliability and coverage.

20 Claims, 11 Drawing Sheets

(51) Int. Cl.
  *H04W 28/06* (2009.01)
  *H04W 80/02* (2009.01)
(58) Field of Classification Search
  USPC .......................................................... 370/329
  See application file for complete search history.

(56) References Cited

U.S. PATENT DOCUMENTS

| | | | |
|---|---|---|---|
| 2005/0201286 | A1 | 9/2005 | Taylor et al. |
| 2006/0199594 | A1* | 9/2006 | Gundu .................. G10L 19/167 455/452.2 |
| 2012/0265523 | A1 | 10/2012 | Greer et al. |
| 2018/0176579 | A1* | 6/2018 | Andrivon ............. H04N 19/463 |
| 2019/0215729 | A1* | 7/2019 | Oyman ............... H04L 65/1006 |

FOREIGN PATENT DOCUMENTS

| | | |
|---|---|---|
| CN | 101009688 A | 8/2007 |
| CN | 101547144 A | 9/2009 |

OTHER PUBLICATIONS

Guo et al., "A New Defined Lower Bit Rate AMR Mode in GSM and WCDMA Networks," 2007 IEEE 65th Vehicular Technology Conference—VTC2007—Spring, pp. 725-729, Institute of Electrical and Electronics Engineers, New York , New York (May 29, 2007).

Rohani et al., "On in-service perceptual speech quality monitoring in cellular radio systems," Wireless Telecommunications Symposium, WTS 2009, total 11 pages (May 2009).

"Series P: Telephone Transmission Quality, Methods for objective and subjective assessment of quality, Methods for subjective determination of transmission quality," ITU-T Recommendation P.800 (Previously CCITT Recommendation), ITU-T Telecommunication Standardization Sector of ITU, Total 37 pages, International Telecommunication Union, Geneva, Switzerland (Aug. 1996).

"3rd Generation Partnership Project; Technical Specification Group Services and System Aspects; Speech codec speech processing functions; Adaptive Multi-Rate—Wideband (AMR-WB) speech codec; Transcoding functions (Release 14)," 3GPP TS 26.190 V14.0.0, pp. 1-51, 3rd Generation Partnership Project, Valbonne, France (Mar. 2017).

"3rd Generation Partnership Project; Technical Specification Group Services and System Aspects; Codec for Enhanced Voice Services (EVS); Detailed Algorithmic Description (Release 14)," 3GPP TS 26.445 V14.2.0, Total 660 pages, 3rd Generation Partnership Project, Valbonne, France (Dec. 2017).

"3rd Generation Partnership Project; Technical Specification Group Services and System Aspects; Codec for Enhanced Voice Services (EVS); Detailed Algorithmic Description (Release 14)," 3GPP TS 26.445 V14.2.0, Figures, Total 15 pages, 3rd Generation Partnership Project, Valbonne, France (Dec. 2017).

"Series P: Terminals and Subjective and Objective Assessment Methods, Methods for objective and subjective assessment of speech quality," Implementers' guide for P.863, ITU-T Telecommunication Standardization Sector of ITU, Total 12 pages, International Telecommunication Union, Geneva, Switzerland (May 2018).

"Series P: Telephone Transmission Quality, Telephone Installations, Local Line Networks, Methods for objective and subjective assessment of speech and video quality, Perceptual evaluation of speech quality (PESQ): An objective method for end-to-end speech quality assessment of narrow-band telephone networks and speech codecs," Recommendation ITU-T P.862 (2001)—Corrigendum 2, ITU-T Telecommunication Standardization Sector of ITU, Total 8 pages, International Telecommunication Union, Geneva, Switzerland (Mar. 2018).

\* cited by examiner

DATA TRANSMISSION METHOD AND APPARATUS

CROSS-REFERENCE TO RELATED APPLICATIONS

This application is a continuation of International Application No. PCT/CN2018/090299, filed on Jun. 7, 2018, the disclosure of which is hereby incorporated by reference in its entirety.

TECHNICAL FIELD

Embodiments of this application relate to the communications field, and more specifically, to a data transmission method and apparatus.

BACKGROUND

In an uplink voice transmission process, improving uplink voice coverage has been receiving wide attention in the industry. Existing voice coverage improvement technologies are mainly used to reduce a data transmission amount and improve transmission reliability. Currently, there are a plurality of solutions for improving uplink coverage, including robust header compression, adaptive rate control, radio link layer control protocol (RLC) segmentation, hybrid automatic repeat request (HARQ) retransmission, and transmission time interval (TTI) bundling. However, due to limited transmit power of a terminal device, although a series of coverage improvement technologies are proposed, a bottleneck of current voice over LTE (VoLTE) still lies in uplink coverage, and a packet loss at a coverage edge or in an interference area causes obvious voice quality deterioration. Therefore, a solution is required to further improve coverage.

SUMMARY

This application provides a data transmission method and apparatus. A transmit end apparatus transmits only significant bits, to minimize a data transmission amount, thereby improving transmission reliability and coverage.

According to a first aspect, a data transmission method is provided. The method includes: obtaining, by a transmit end apparatus, significant bits in an $N^{th}$ data frame, where N is an integer greater than or equal to 1, a quantity of the significant bits in the $N^{th}$ data frame is smaller than a quantity of bits in the $N^{th}$ data frame, and remaining bits other than the significant bits in the $N^{th}$ data frame are insignificant bits in the $N^{th}$ data frame; and sending, by the transmit end apparatus, the significant bits in the $N^{th}$ data frame, and skipping sending the insignificant bits in the $N^{th}$ data frame.

In this embodiment of this application, on a premise of ensuring voice intelligibility, the transmit end apparatus transmits only the significant bits in the data frame, and does not transmit the insignificant bits, to minimize a data transmission amount, thereby improving transmission reliability and coverage.

In an optional implementation, the method further includes: obtaining significant bits in an $M^{th}$ data frame, where M is an integer greater than or equal to 1 and less than or equal to N, a quantity of the significant bits in the $M^{th}$ data frame is smaller than a quantity of bits in the $M^{th}$ data frame, and remaining bits other than the significant bits in the $M^{th}$ data frame are insignificant bits in the $M^{th}$ data frame; and the sending the significant bits in the $N^{th}$ data frame, and skipping sending the insignificant bits in the $N^{th}$ data frame includes: sending the significant bits in the $N^{th}$ data frame and the significant bits in the $M^{th}$ data frame, and skipping sending the insignificant bits in the $N^{th}$ data frame and the insignificant bits in the $M^{th}$ data frame.

Herein, the transmit end apparatus may send the significant bits in the $N^{th}$ data frame and the significant bits in the $M^{th}$ data frame to a receive end apparatus, so that the receive end apparatus obtains a target $N^{th}$ to-be-decoded data frame based on the significant bits in the $N^{th}$ data frame, and obtains an $M^{th}$ to-be-decoded data frame based on the significant bits in the $M^{th}$ data frame, to better resist a packet loss.

Optionally, the significant bits in the data frame are bits, corresponding to preset distortion information, in the data frame. Optionally, the preset distortion information may be obtained by using a mean opinion score (MOS) value.

Optionally, the $N^{th}$ data frame is the first frame, where M=N=1; or the $N^{th}$ data frame is not the first frame, where M<N and $1 \leq N-M \leq 7$.

Optionally, the $N^{th}$ data frame is a voice frame, or both the $N^{th}$ data frame and the $M^{th}$ data frame are voice frames.

In an optional implementation, the $N^{th}$ data frame is an adaptive multi-rate AMR voice frame, and the significant bits in the $N^{th}$ data frame are a class A subflow in the $N^{th}$ data frame; or
the $M^{th}$ data frame is an adaptive multi-rate AMR voice frame, and the significant bits in the $M^{th}$ data frame are a class A subflow in the $M^{th}$ data frame.

In an optional implementation, the $N^{th}$ data frame is an enhanced voice service EVS frame, and the preset distortion information is a mean opinion score MOS value; or
the $M^{th}$ data frame is an EVS frame, and the preset distortion information is a mean opinion score MOS value.

Optionally, significant bits of the EVS frame may be obtained in the following manner: performing bit inversion, and using bits with MOS value changes that meet a filtering threshold after the bit inversion as the significant bits of the EVS frame.

In an optional implementation, the method further includes:
sending indication information, where the indication information is used to indicate that sent significant bits include the significant bits in the $N^{th}$ data frame, or sent significant bits include the significant bits in the $N^{th}$ data frame and the significant bits in the $M^{th}$ data frame.

Therefore, the transmit end apparatus may indicate, to the receive end apparatus, whether a sent data frame is significant bits of a single frame or significant bits of a dual frame.

According to a second aspect, a data transmission method is provided. The method includes: receiving, by a receive end apparatus, significant bits in an $N^{th}$ data frame, where N is an integer greater than or equal to 1, a quantity of the significant bits in the $N^{th}$ data frame is smaller than a quantity of bits in the $N^{th}$ data frame, and remaining bits other than the significant bits in the $N^{th}$ data frame are insignificant bits in the $N^{th}$ data frame; and obtaining an $N^{th}$ to-be-decoded data frame based on the significant bits in the $N^{th}$ data frame, where the $N^{th}$ to-be-decoded data frame includes the significant bits in the $N^{th}$ data frame. In this way, the receive end apparatus may perform decoding based on the significant bits, so that even if signal quality is relatively poor, a call can be ensured, thereby improving transmission reliability and coverage.

Optionally, the $N^{th}$ to-be-decoded data frame further includes padding bits. Herein, the receive end apparatus may perform padding processing for the insignificant bits that are not received, to obtain a data frame with a valid frame length.

In an optional implementation, the receiving significant bits in an $N^{th}$ data frame includes:

receiving the significant bits in the $N^{th}$ data frame and significant bits in an $M^{th}$ data frame, where M is an integer greater than or equal to 1 and less than or equal to N, a quantity of the significant bits in the $M^{th}$ data frame is smaller than a quantity of bits in the $M^{th}$ data frame, and remaining bits other than the significant bits in the $M^{th}$ data frame are insignificant bits in the $M^{th}$ data frame; and the method further includes: obtaining an $M^{th}$ to-be-decoded data frame based on the significant bits in the $M^{th}$ data frame.

Herein, the receive end apparatus obtains the target $N^{th}$ to-be-decoded data frame based on the significant bits in the $N^{th}$ data frame, and obtains the $M^{th}$ to-be-decoded data frame based on the significant bits in the $M^{th}$ data frame, to better resist a packet loss.

Optionally, the $M^{th}$ to-be-decoded data frame further includes padding bits. Herein, the receive end apparatus may perform padding processing for the insignificant bits that are not received, to obtain a data frame with a valid frame length.

Optionally, the $N^{th}$ data frame is the first frame, where M=N=1; or the $N^{th}$ data frame is not the first frame, where M<N and $1 \leq N-M \leq 7$.

Optionally, the $N^{th}$ data frame is a voice frame, or both the $N^{th}$ data frame and the $M^{th}$ data frame are voice frames.

Optionally, the $N^{th}$ data frame is an adaptive multi-rate AMR voice frame, and the significant bits in the $N^{th}$ data frame are a class A subflow in the $N^{th}$ data frame; or the $M^{th}$ data frame is an adaptive multi-rate AMR voice frame, and the significant bits in the $M^{th}$ data frame are a class A subflow in the $M^{th}$ data frame.

In an optional implementation, the $N^{th}$ data frame is an enhanced voice service EVS frame, and the preset distortion information is a mean opinion score MOS value; or the $M^{th}$ data frame is an EVS frame, and the preset distortion information is a mean opinion score MOS value.

Optionally, significant bits of the EVS frame may be obtained in the following manner: performing bit inversion, and using bits with MOS value changes that meet a filtering threshold after the bit inversion as the significant bits of the EVS frame.

In an optional implementation, the method further includes:

receiving indication information, where the indication information is used to indicate that received significant bits include the significant bits in the $N^{th}$ data frame, or received significant bits include the significant bits in the $N^{th}$ data frame and the significant bits in the $M^{th}$ data frame. Therefore, the receive end apparatus may learn, based on the indication information, whether a data frame sent by a transmit end apparatus is significant bits of a single frame or significant bits of a dual frame.

According to a third aspect, a data transmission apparatus is provided. The apparatus may be an apparatus applied to a terminal device or a radio access network device, or may be a chip or a circuit, and is configured to perform the method according to any one of the first aspect or the possible implementations of the first aspect. Specifically, the apparatus may be implemented by hardware, or may be implemented by hardware executing corresponding software.

In some possible implementations, the apparatus includes modules configured to perform the method according to any one of the first aspect or the possible implementations of the first aspect.

In some possible implementations, the apparatus includes a processor and a memory. The memory is configured to store an instruction. When the communications apparatus runs, the processor executes the instruction stored in the memory, so that the communications apparatus performs the data transmission method according to any one of the first aspect or the implementations of the first aspect. It should be noted that the memory may be integrated into the processor, or may be independent of the processor.

In some possible implementations, the apparatus includes a processor. The processor is configured to couple to a memory, read an instruction in the memory, and perform, according to the instruction, the data transmission method according to any one of the first aspect or the implementations of the first aspect.

According to a fourth aspect, a data transmission apparatus is provided. The apparatus may be an apparatus applied to a terminal device or a radio access network device, or may be a chip or a circuit, and is configured to perform the method according to any one of the second aspect or the possible implementations of the second aspect. Specifically, the apparatus may be implemented by hardware, or may be implemented by hardware executing corresponding software.

In some possible implementations, the apparatus includes modules configured to perform the method according to any one of the second aspect or the possible implementations of the second aspect.

In some possible implementations, the apparatus includes a processor and a memory. The memory is configured to store an instruction. When the communications apparatus runs, the processor executes the instruction stored in the memory, so that the communications apparatus performs the data transmission method according to any one of the second aspect or the implementations of the second aspect. It should be noted that the memory may be integrated into the processor, or may be independent of the processor.

In some possible implementations, the apparatus includes a processor. The processor is configured to couple to a memory, read an instruction in the memory, and perform, according to the instruction, the data transmission method according to any one of the second aspect or the implementations of the second aspect.

According to a fifth aspect, a computer-readable storage medium is provided. The computer-readable storage medium stores a program. The program enables a communications apparatus to perform the data transmission method according to any one of the foregoing aspects and the implementations of the foregoing aspects.

According to a sixth aspect, this application further provides a computer program product including an instruction. When the computer program product runs on a computer, the computer is enabled to perform the data transmission method according to any one of the foregoing aspects.

According to a seventh aspect, this application further provides a system. The system includes a transmit end apparatus, and the transmit end apparatus may be configured to perform the steps performed by the transmit end apparatus in any one of the first aspect and the method of the first aspect.

In some possible implementations, the system may further include a receive end apparatus, and the receive end apparatus may be configured to perform the steps performed by the receive end apparatus in any one of the second aspect and the method of the second aspect.

In some possible implementations, the system may further include another device that interacts with the transmit end apparatus and/or the receive end apparatus in the embodiments of this application, and the like.

According to an eighth aspect, a chip system is provided. The chip system includes a processor. The processor is connected to a memory, and the processor is configured to invoke a computer program from the memory and run the computer program, to enable a communications device on which the chip system is installed to perform the method according to any one of the foregoing aspects and the possible implementations of the foregoing aspects. The memory may be located inside the chip system, or may be located outside the chip system.

DESCRIPTION OF EMBODIMENTS

The following describes the technical solutions in this application with reference to the accompanying drawings.

The technical solutions of the embodiments of this application may be applied to various communications systems, for example, a global system for mobile communications (GSM) system, a code division multiple access (CDMA) system, a wideband code division multiple access (WCDMA) system, a communications system based on an orthogonal frequency division multiplexing (OFDM) technology, a general packet radio service (GPRS) system, a long term evolution (LTE) system, an LTE frequency division duplex (FDD) system, an LTE time division duplex (TDD) system, a universal mobile telecommunications system (UMTS), a wireless fidelity (Wi-Fi) system, a worldwide interoperability for microwave access (WiMAX) communications system, a wireless local area network (WLAN) system, a public land mobile network (PLMN) system, a vehicle to everything (V2X) system, and a future 5th generation (5G) system or a new radio (NR) system.

Figure 1:
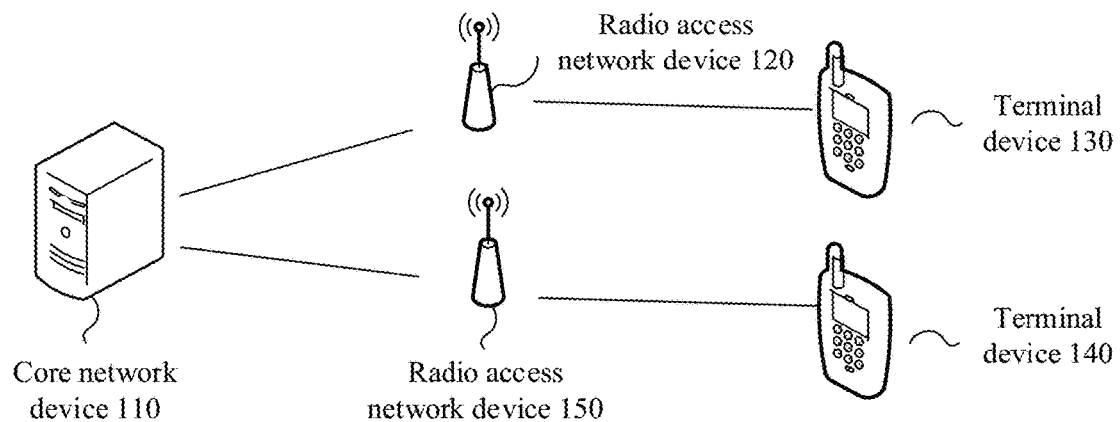
FIG. 1 is a schematic architectural diagram of a mobile communications system to which an embodiment of this application is applied.

FIG. 1 is a schematic architectural diagram of a mobile communications system to which an embodiment of this application is applied. As shown in FIG. 1, the mobile communications system includes a core network device 110, one or more radio access network devices (for example, either or both of a radio access network device 120 and a radio access network device 150 in FIG. 1), and one or more terminal devices (for example, either or both of a terminal device 130 and a terminal device 140 in FIG. 1). The terminal device is connected to the radio access network device in a wireless manner, and the radio access network device is connected to the core network device in a wireless or wired manner. The core network device and the radio access network device may be different physical devices independent of each other, or a function of the core network device and a logic function of the radio access network device may be integrated into one physical device, or a part of functions of the core network device and a part of functions of the radio access network device may be integrated into one physical device. The terminal device may be located at a fixed location, or may be removable. It should be understood that FIG. 1 is merely a schematic diagram, and the communications system may further include another network device, for example, may further include a wireless relay device and a wireless backhaul device (not shown in FIG. 1). Quantities of core network devices, radio access network devices, and terminal devices included in the mobile communications system are not limited in this embodiment of this application.

The radio access network device is an access device or a network device that connects the terminal device to the mobile communications system in a wireless manner, and may be a NodeB, an evolved NodeB eNodeB, a gNodeB gNB in a 5G mobile communications system, a base station in a future mobile communications system, an access node in a Wi-Fi system, a radio controller in a cloud radio access network (CRAN) scenario, a relay station, an access point, a vehicle-mounted device, a wearable device, a network device in a future 5G network, a network device in a future evolved PLMN network, or the like. A specific technology and a specific device form that are used by the radio access network device are not limited in the embodiments of this application.

The terminal device may also be referred to as a terminal, user equipment (UE), a mobile station (MS), a mobile terminal (MT), or the like. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a station (ST) in a WLAN, or the like.

The core network device includes, for example, a mobility management entity (MME) or a broadcast/multicast service center (BMSC), or may include a corresponding function entity in a 5G system, for example, a network function of a core network control plane (CP) or user plane (UP). For example, the network function may be a session management network function (SMF) or an access and mobility management function (AMF). The core network control plane may also be understood as a core network control plane function (CPF) entity.

The radio access network device and the terminal device may be deployed on the land, and may be an indoor device, an outdoor device, a handheld device, or a vehicle-mounted device; may be deployed on the water; or may be deployed on an airplane, a balloon, and a satellite in the air. Application scenarios of the radio access network device and the terminal device are not limited in the embodiments of this application.

The embodiments of this application may be applied to downlink signal transmission, or may be applied to uplink signal transmission, or may be applied to device-to-device (D2D) signal transmission. For the downlink signal transmission, a sending device is a radio access network device, and a corresponding receiving device is a terminal device. For the uplink signal transmission, a sending device is a terminal device, and a corresponding receiving device is a radio access network device. For the D2D signal transmission, a sending device is a terminal device, and a corresponding receiving device is also a terminal device. A signal transmission direction is not limited in the embodiments of this application.

Communication between a radio access network device and a terminal device and communication between terminal devices may be performed by using a licensed spectrum, or an unlicensed spectrum, or both a licensed spectrum and an unlicensed spectrum. Communication between a radio access network device and a terminal device and communication between terminal devices may be performed by using a spectrum below 6 gigahertz (GHz), or a spectrum above 6 GHz, or both a spectrum below 6 GHz and a spectrum above 6 GHz. A spectrum resource used between the radio access network device and the terminal device is not limited in the embodiments of this application.

A method and an apparatus that are provided in the embodiments of this application may be applied to a terminal device or a network device. The terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more computer operating systems, such as a Linux operating system, a Unix operating system, an Android operating system, an iOS operating system, or a Windows operating system, that implement service processing through a process. The application layer includes applications such as a browser, an address book, word processing software, and instant communications software. In addition, in the embodiments of this application, a specific structure of an entity for performing a data transmission method is not specially limited in the embodiments of this application, provided that the entity can run a program recording code of the data transmission method according to the embodiments of this application, to perform communication based on the data transmission method according to the embodiments of this application. For example, the data communication method according to the embodiments of this application may be performed by the terminal device or the network device, or a functional module that is in the terminal device or the network device and that can invoke and execute the program.

In addition, aspects or features in the embodiments of this application may be implemented as a method, an apparatus, or a product that uses standard programming and/or engineering technologies. The term "product" used in the embodiments of this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry an instruction and/or data.

In LTE, peer-to-peer protocol layers of a network device and a terminal device include a physical layer, a MAC layer, an RLC layer, and a PDCP layer. Uplink voice transmission is used as an example. A PDCP voice packet of the terminal device is delivered to the RLC layer, and is segmented (where a segment size is indicated by the MAC layer, and the MAC layer indication is from the network device) and connected in series at the RLC layer. Then, RLC segments are transmitted to the MAC layer and added with MAC headers, and a MAC data packet is sent after modulation and coding are performed at the physical layer. After receiving data, the physical layer of the network device demodulates and decodes the data, removes the headers, and delivers the RLC segments to the RLC layer. The RLC layer sorts and assembles the RLC segments, and delivers an assembled PDCP packet to the PDCP layer. The PDCP layer decrypts the PDCP packet and delivers the packet to a core network.

The following describes some terms or concepts involved in voice transmission.

Voice evaluation standards of a vocoder may be classified into voice quality evaluation and intelligibility evaluation.

(1) Voice Quality Evaluation

Currently, voice quality evaluation methods mainly include subjective evaluation and objective evaluation. Comparatively, subjective evaluation (ITU-T P.800) is the most accurate and recognized voice quality test method, in which a large quantity of experts listen to voice samples and provide a mean opinion score (MOS) (1-5 points) of subjective voice evaluation. However, this method costs large manpower and cannot meet requirements on an automatic test and a large-scale network test. Currently, objective evaluation (PESQ ITU-T P.862/P.863) is the most popular voice quality evaluation method, in which human ears are replaced with some measurement technologies and algorithms and finally an equivalent MOS value is provided. This method is widely used by operators.

(2) Intelligibility Evaluation (that is, Diagnostic Rhyme Test (DRT))

The intelligibility evaluation is subjective evaluation, and is mainly used for a quality test of extremely low-rate voice coding. In this test method, a plurality of pairs (usually 96 pairs) of words or syllables with a same vowel (for example, "wei" and "fei" in Chinese, and "veal" and "feal" in English) are used for test. A percentage of correct determining by all listeners is a DRT score (definition). In actual communication, when the definition is 50%, intelligibility of an entire sentence is about 80%, because context has high redundancy to help infer. When the definition is 90%, intelligibility of an entire sentence is close to 100%.

The foregoing evaluation manner may be applied to evaluation of a plurality of types of voice frames, including an AMR voice frame, an EVS voice frame, and the like.

An AMR is a mainstream vocoder of VoLTE. The AMR includes a narrowband vocoder AMR-NB and a wideband vocoder AMR-WB, where the AMR-WB is more commonly used currently. A sampling frequency of the AMR-NB is 8 kHz, and there are eight encoding rates from 4.75 kbit/s to 12.2 kbit/s. A sampling frequency of the AMR-WB is 16 kHz, and there are nine encoding rates from 6.6 kbit/s to 23.85 kbit/s. The AMR vocoder is different from a vocoder for voice coding at a fixed bit rate. A bit rate of the AMR vocoder can vary with a transmission environment, and therefore the AMR vocoder is self-adaptive. Compared with the AMR-NB, the AMR-WB is a high-quality digital wideband voice coding system, where a high-frequency band enhances naturalness and a comfort level of voice and improves voice understandability. Bits output by an AMR voice coder are re-sorted according to subjective significance of the bits. The most significant bits are transmitted first, that is, significant bits MSBs of each frame are transmitted first. The subjective significance refers to impact on voice quality that is caused when an error occurs in transmission of the bit. Table 1 below shows distribution of subflows A, B, and C in the AMR-WB. As shown in Table 1, the AMR encoder divides encoded bits into three parts, and the three parts are referred to as the subflows A, B, and C. Sensitivity of the subflows to an error bit is sorted as follows: subflow A>subflow B>subflow C. Bits contained in the subflow A are bits that are most sensitive to an error. When this type of coded bit has an error, a voice frame is severely damaged. Not only subjective voice experience is greatly deteriorated, but also a problem that decoding cannot be correctly performed on a receiving side may be caused. When an error occurs in voice bits in the subflow B or C, subjective voice experience gradually decreases in a sort order of the bits. When the subflow B or C has an error, a decoder on the receiving side can complete decoding normally based on the subflow A, and significant bits may be a subflow A in a voice frame of the AMR-WB or the AMR-NB.

TABLE 1

| AMR-WB encoding rate | Total quantity of bits (total number of bits) | Class A | Class B | Class C |
|---|---|---|---|---|
| 6.60 | 132 | 54 | 78 | 0 |
| 8.85 | 177 | 64 | 113 | 0 |
| 12.65 | 253 | 72 | 181 | 0 |
| 14.25 | 285 | 72 | 213 | 0 |
| 15.85 | 317 | 72 | 245 | 0 |
| 18.25 | 365 | 72 | 293 | 0 |

TABLE 1-continued

| AMR-WB encoding rate | Total quantity of bits (total number of bits) | Class A | Class B | Class C |
|---|---|---|---|---|
| 19.85 | 397 | 72 | 325 | 0 |
| 23.05 | 461 | 72 | 389 | 0 |
| 23.85 | 477 | 72 | 405 | 0 |

In addition, Table 2 below shows distribution of subflows A, B, and C in the AMR-NB. Similarly, the AMR encoder divides encoded bits of the AMR-NB into three parts, and the three parts are referred to as the subflows A, B, and C. Sensitivity of the subflows to an error bit is sorted as follows: subflow A>subflow B>subflow C.

TABLE 2

| AMR-NB encoding rate | Total quantity of bits | Class A | Class B | Class C |
|---|---|---|---|---|
| 12.2 | 244 | 81 | 103 | 60 |
| 10.2 | 204 | 65 | 99 | 40 |
| 7.95 | 159 | 75 | 84 | 0 |
| 7.4 | 148 | 61 | 87 | 0 |
| 6.7 | 134 | 58 | 76 | 0 |
| 5.9 | 118 | 55 | 63 | 0 |
| 5.15 | 103 | 49 | 54 | 0 |
| 4.75 | 95 | 42 | 53 | 0 |
| SID (1.8) | 39 | 39 | 0 | 0 |
| No Data (0) | 0 | 0 | 0 | 0 |

It should be understood that for explanations of terms in Table 1 and Table 2, refer to descriptions in the prior art. Details are not described herein.

Figure 2:
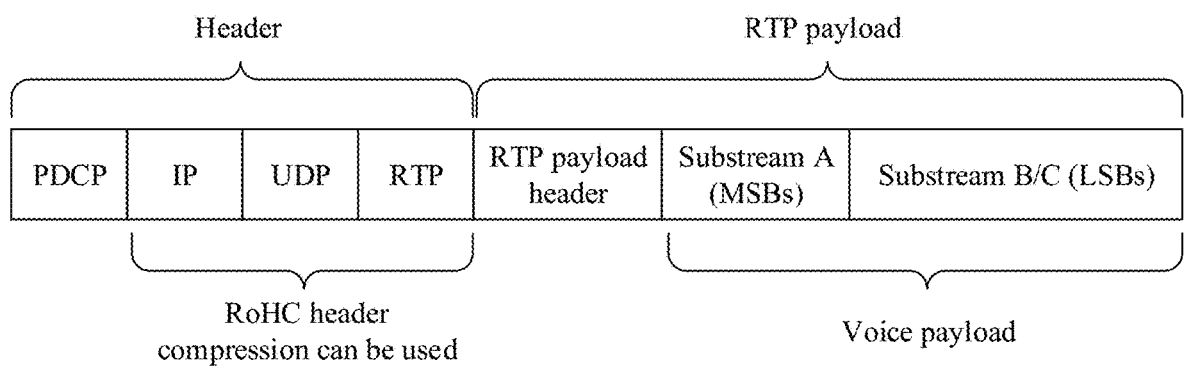
FIG. 2 is a schematic diagram of a typical PDCP packet assembly format of a voice frame in VoLTE.

The following describes a format of the AMR voice frame with reference to FIG. 2. FIG. 2 is a schematic diagram of a typical PDCP packet assembly format of a voice frame in VoLTE. As shown in FIG. 2, from a bottom layer to a higher layer, headers include a packet data convergence protocol (PDCP) header, a network protocol (IP) header, a user datagram protocol (UDP) header, and a real-time transport protocol (RTP) header. Robust header compression (RoHC) can be used for the IP header, the UDP header, and the RTP header. These headers are followed by an RTP payload. The RTP payload includes an RTP payload header and a voice payload. The voice payload includes a class A subflow and a class B/C subflow. Voice payloads are sorted according to significance of bits.

EVS is a next-generation high definition voice solution, proposed by 3GPP, following the AMR-WB. The EVS supports four voice sampling rates: 8 kHz, 16 kHz, 32 kHz, and 48 kHz. Similar to the AMR-WB, the EVS has a plurality of encoding rates and supports a wide dynamic range of 12 encoding modes in total, ranging from a bit rate of 5.9 kbit/s to a bit rate of 128 kbit/s. In addition, different from the AMR-WB, the EVS vocoder has some new features, for example, "variable bit rate (VBR)" and "channel awared mode (CAM)". Encoding and decoding performance of the EVS is comprehensively better than that of the AMR-WB, and the EVS will become a mainstream vocoder of voice over new radio (VoNR). Bits in the EVS voice frame may also be classified into significant bits and insignificant bits in the foregoing evaluation manners. In the embodiments of this application, the significant bits in the EVS voice frame may be sifted out based on the MOS value.

The encoding rates of the AMR and EVS vocoders are not low. When a packet loss rate is relatively low, voice quality fidelity of the AMR and EVS vocoders is relatively high.

Currently, existing voice transmission is full-frame transmission. This application provides a solution in which only significant bits of a voice frame are transmitted, so that a data transmission amount is minimized while voice intelligibility is ensured, thereby further improving coverage.

The following describes in detail the data transmission method according to the embodiments of this application with reference to FIG. 3 to FIG. 11.

Figure 3:
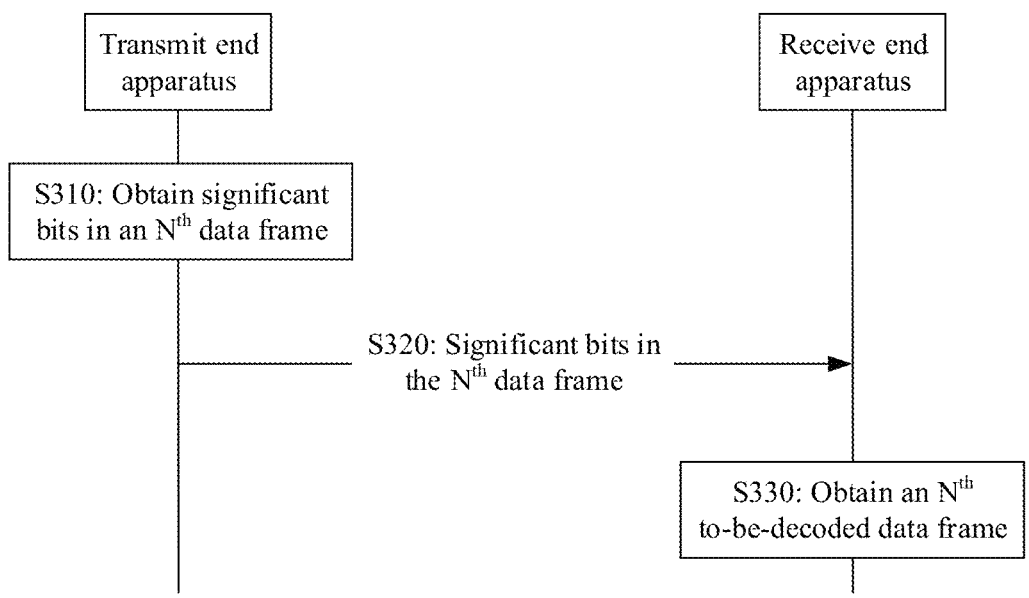
FIG. 3 is a schematic interaction diagram of a data transmission method according to an embodiment of this application.

FIG. 3 is a schematic interaction diagram of a data transmission method 300 according to an embodiment of this application. For example, a transmit end apparatus in the method 300 may be a chip. Optionally, the chip may be a chip in a terminal device. For example, the terminal device may be the terminal device in FIG. 1 (for example, the terminal device 130 or the terminal device 140 in FIG. 1). Correspondingly, a receive end apparatus may also be a chip. Optionally, the chip may be a chip in a radio access network device. For example, the radio access network device may be the radio access network device in FIG. 1 (the radio access network device 120 or the radio access network device 150 in FIG. 1). In a possible implementation, the transmit end apparatus may alternatively be a radio access network device (the radio access network device 120 or the radio access network device 150 in FIG. 1), and correspondingly, the receive end apparatus may be a terminal device (for example, the terminal device 130 or the terminal device 140 in FIG. 1). As shown in FIG. 3, the method 300 includes the following steps.

S310: The transmit end apparatus obtains significant bits in an $N^{th}$ data frame. N is an integer greater than or equal to 1, the significant bits in the $N^{th}$ data frame correspond to preset distortion information, a quantity of the significant bits in the $N^{th}$ data frame is smaller than a quantity of bits in the $N^{th}$ data frame, and remaining bits other than the significant bits in the $N^{th}$ data frame are insignificant bits in the $N^{th}$ data frame.

The preset distortion information is information used to represent acceptable distortion of a data service (including a voice service), for example, indicator information of intelligibility of voice quality, quantized indicator information of voice call quality that can be accepted by a user, or sensitivity to an error bit. The preset distortion information may be understood as information used to sift out the significant bits (for example, most significant bits (MSB)). In a possible implementation, the preset distortion information may be determined according to the intelligibility of the voice quality. A transmit end may obtain, by using the preset distortion information, the significant bits that affect the voice quality. For example, in the voice service, significant bits are bits that play a key role in voice quality or voice intelligibility, and insignificant bits (for example, least significant bits (LSB)) are bits that do not play a key role in the voice quality or the voice intelligibility. After receiving the significant bits, even if the receive end apparatus does not receive the insignificant bits, the receive end apparatus may complete decoding after performing padding processing. Quality of the data service may meet preset distortion (or acceptable distortion) after the decoding.

Optionally, the preset distortion information may be obtained by using a mean opinion score (MOS) value, or the preset distortion information may be obtained by using another evaluation system. This is not limited in this embodiment of this application.

Optionally, the preset distortion information may be agreed on by the transmit end apparatus and the receive end apparatus, in other words, both two ends know the preset distortion information; or the preset distortion information may be configured by one of the two ends. This is not specifically limited in this embodiment of this application.

Optionally, the $N^{th}$ data frame may be a voice frame, for example, a voice over LTE (VoLTE) frame, or a voice over new radio VoNR frame.

Specifically, for example, the $N^{th}$ data frame is an adaptive multi-rate AMR voice frame. Because a class A subflow in the AMR voice frame corresponds to relatively high sensitivity to an error bit, in a possible implementation, the significant bits in the $N^{th}$ data frame may be a class A subflow in the $N^{th}$ data frame.

For another example, the $N^{th}$ data frame is an enhanced voice service EVS frame, the preset distortion information is a mean opinion score MOS value, and bits corresponding to the MOS value may be used as the significant bits.

Figure 4:
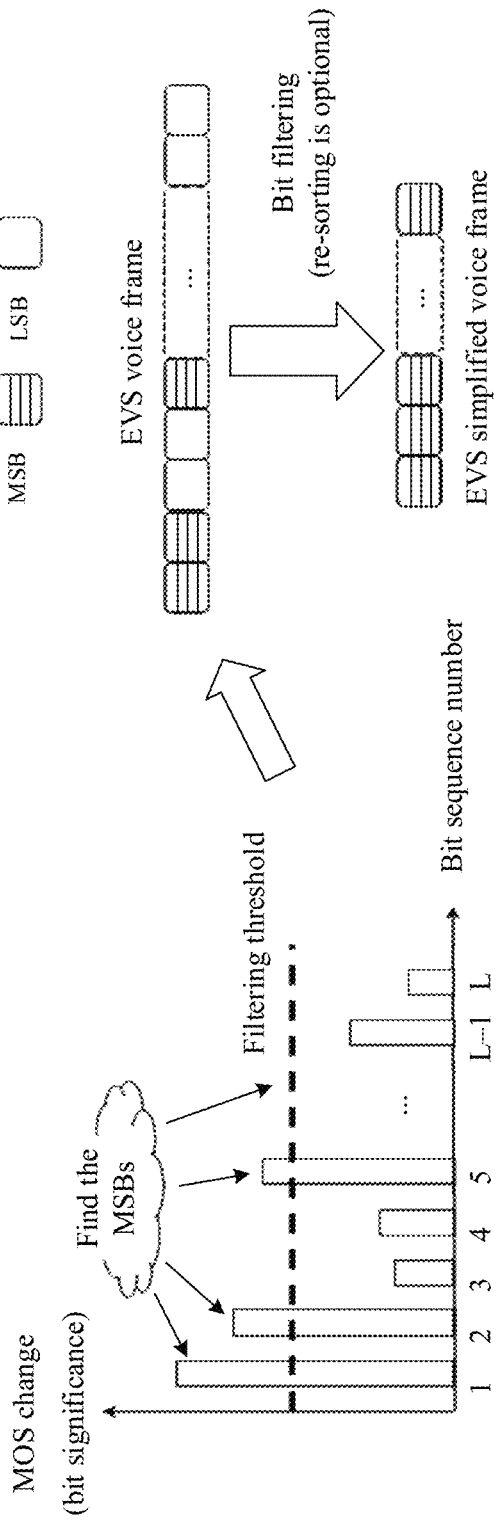
FIG. 4 is a schematic diagram of an example of sifting out significant bits in an EVS frame according to an embodiment of this application.

It should be noted that in an existing EVS protocol TS26.445, bit significance of the EVS frame is not evaluated. This application provides a solution for obtaining, through evaluation, significant bits in an EVS frame. Specifically, the bit significance of the EVS frame may be evaluated by using objective MOS scoring software P.863: For a given EVS encoding rate, test audio is encoded first. FIG. 4 is a schematic diagram of an example of sifting out significant bits in an EVS frame according to an embodiment of this application. As shown in FIG. 4 (where a horizontal coordinate represents a bit sequence number, and a vertical coordinate represents a MOS change), it is assumed that a voice payload length is L bits, an $i^{th}$ ($1 \leq i \leq L$) bit of an encoded voice frame is inverted every n frames (where n may be 2 to 5), and after decoding, N segments of different inverted bits can be obtained. A MOS of the inverted bit is tested, and is compared with a MOS of a bit without a frame loss or a bit error, so that an inverted bit with a larger MOS decrease is more significant, that is, the inverted bit with a larger MOS decrease is used as a significant bit. Herein, a filtering threshold may be introduced to find the significant bit. By setting the filtering threshold, an inverted bit whose MOS decrease exceeds the filtering threshold is considered as the significant bit. In this way, the bit significance of the EVS may be sorted, and a part of bits with relatively high significance are used as the most significant bits of the EVS with reference to a proportion of a subflow A of the AMR.

The filtering threshold may be a specific MOS value, or may be a MOS value range. This is not limited. For example, if there are 100 bits, bits corresponding to inverted bits whose change value of MOSs rank the first 20% among the 100 bits may be set as the significant bits. For another example, the threshold may be set to a specific MOS value, and only a bit whose MOS decrease exceeds the MOS value can be considered as the significant bit. Certainly, a premise of the foregoing principle of determining the filtering threshold is as follows: Acceptable distortion of a service is ensured, that is, voice quality is not affected, so that the receive end apparatus can normally perform decoding.

It should be understood that, after the significant bits of the EVS frame are determined, the transmit end apparatus may send the significant bits of the EVS frame to the receive end apparatus.

It should be further understood that after the significant bits of the EVS frame are determined, both the transmit end apparatus and the receive end apparatus can identify the significant bits of the EVS.

S320: The transmit end apparatus sends the significant bits in the $N^{th}$ data frame, and skips sending the insignificant bits in the $N^{th}$ data frame.

Correspondingly, the receive end apparatus receives the significant bits in the $N^{th}$ data frame.

Herein, a difference from a solution of full-frame transmission in the prior art lies in that: In this embodiment of this application, only the significant bits need to be transmitted, and the insignificant bits do not need to be transmitted. The significant bits can ensure that the receive end apparatus can normally decode the $N^{th}$ data frame when no insignificant bit is received.

S330: The receive end apparatus obtains an $N^{th}$ to-be-decoded data frame based on the significant bits in the $N^{th}$ data frame, where the $N^{th}$ to-be-decoded data frame includes the significant bits in the $N^{th}$ data frame.

Optionally, the $N^{th}$ to-be-decoded data frame may further include padding bits. Herein, the padding bits may be any bits, for example, bits arranged according to a pseudo-random sequence such as a random 0-1 bit sequence.

That is, after receiving the significant bits in the $N^{th}$ data frame, the receive end apparatus may obtain the $N^{th}$ to-be-decoded data frame. During decoding, a data frame of a valid frame length needs to be used. The receive end apparatus pads remaining bits of the $N^{th}$ to-be-decoded data frame, to obtain a complete data frame. The receive end apparatus performs decoding based on the complete data frame, to obtain a corresponding data service through decoding. Herein, after obtaining the complete data frame, the receive end apparatus may deliver the complete data frame to a higher layer for decoding. For example, the receive end apparatus is deployed in the radio access network device, and may deliver the complete data frame to a core network for decoding. For another example, the receive end apparatus is deployed in the terminal device, and may deliver the complete data frame to a decoding apparatus in the terminal device for decoding.

In this embodiment of this application, on a premise of ensuring voice intelligibility, the transmit end apparatus transmits only the significant bits, to minimize a data transmission amount, so that the receive end apparatus can ensure a call based on the significant bits even if signal quality is relatively poor, thereby improving transmission reliability and coverage.

Figure 5:
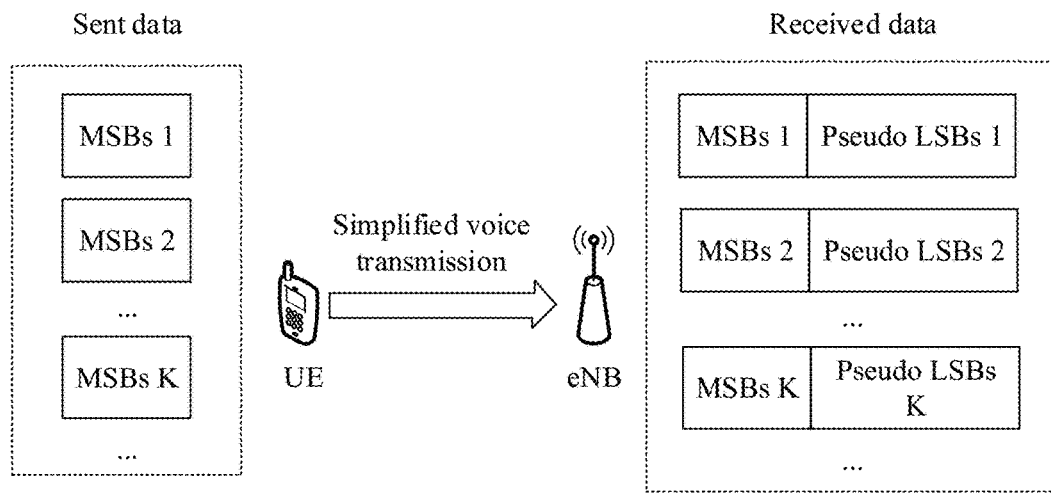
FIG. 5 is a schematic diagram of an example of single-frame transmission according to an embodiment of this application.

In this embodiment of this application, the transmit end apparatus may not only send the significant bits in the $N^{th}$ data frame to the receive end apparatus, but also send both the significant bits in the $N^{th}$ data frame and significant bits in an $M^{th}$ data frame to the receive end apparatus. In other words, the transmit end apparatus may send a significant bit of a single frame to the receive end apparatus, or may send significant bits of a dual frame (which may be understood as a frame obtained by aggregating two frames) to the receive end apparatus. FIG. 5 is a schematic diagram of an example of single-frame transmission according to an embodiment of this application. As shown in FIG. 5, a UE side is used as a transmit end apparatus, and an eNB is used as a receive end apparatus. Data sent by UE includes MSBs of I aggregated frames, and each aggregated frame may be understood as a voice PDCP packet. If a current frame is a $K^{th}$ frame, an aggregated frame K includes significant bits (for example, MSBs K) of the $K^{th}$ frame, where K≤I. That is, in each frame, only MSBs of the current frame are transmitted, but LSBs are not transmitted. Correspondingly, after correctly receiving the aggregated frame, the eNB performs padding for untransmitted LSBs by using a random 0-1 sequence. Specifically, for MSBs 1, padding is performed for untransmitted LSBs by using pseudo LSBs 1, for MSBs 2, padding is performed for untransmitted LSBs by using pseudo LSBs 2, . . . , and for the MSBs K, padding is performed for untransmitted LSBs by using pseudo LSBs K, so as to form a data frame of a valid frame length.

The following describes a case in which the transmit end apparatus sends both the significant bits in the $N^{th}$ data frame and the significant bits in the $M^{th}$ data frame to the receive end apparatus.

Optionally, the method 300 further includes the following step:

The transmit end apparatus obtains the significant bits in the $M^{th}$ data frame, where M is an integer greater than or equal to 1 and less than or equal to N, a quantity of the significant bits in the $M^{th}$ data frame is smaller than a quantity of bits in the $M^{th}$ data frame, and remaining bits other than the significant bits in the $M^{th}$ data frame are insignificant bits in the $M^{th}$ data frame.

S320 includes the following step:

The transmit end apparatus sends the significant bits in the $N^{th}$ data frame and the significant bits in the $M^{th}$ data frame, and skips sending insignificant bits in the $N^{th}$ data frame and the insignificant bits in the $M^{th}$ data frame. Correspondingly, the receive end apparatus receives the significant bits in the $N^{th}$ data frame and the significant bits in the $M^{th}$ data frame.

It should be understood that, for explanation of the preset distortion information, refer to the foregoing descriptions. Details are not described herein again.

Specifically, the transmit end apparatus may send the significant bits in the $N^{th}$ data frame and the significant bits in the $M^{th}$ data frame to the receive end apparatus, so that the receive end apparatus obtains the target $N^{th}$ to-be-decoded data frame based on the significant bits in the $N^{th}$ data frame, and obtains an $M^{th}$ to-be-decoded data frame based on the significant bits in the $M^{th}$ data frame. In addition, the transmit end apparatus sends the significant bits in the $N^{th}$ data frame and the significant bits in the $M^{th}$ data frame together to the receive end apparatus, so that overheads of the receive end apparatus can be reduced.

Optionally, both the $N^{th}$ data frame and the $M^{th}$ data frame may be voice frames, for example, VoLTE frames or voice over new radio VoNR frames.

Optionally, the $N^{th}$ data frame is an adaptive multi-rate AMR voice frame. The significant bits in the $N^{th}$ data frame are a class A subflow in the $N^{th}$ data frame. Alternatively, optionally, the $M^{th}$ data frame is an adaptive multi-rate AMR voice frame. The significant bits in the $M^{th}$ data frame are a class A subflow in the $M^{th}$ data frame.

Optionally, the $N^{th}$ data frame is an enhanced voice service EVS frame, and the preset distortion information is a mean opinion score MOS value; or the $M^{th}$ data frame is an EVS frame, and the preset distortion information is a mean opinion score MOS value. Herein, for determining of significant bits of the EVS frame, refer to the foregoing descriptions. Details are not described herein again.

It should be noted that both the $N^{th}$ data frame and the $M^{th}$ data frame may be the first frames (that is, the first frames), or the $N^{th}$ data frame is not the first frame (that is, not the first frame), that is, an offset may alternatively exist between the $N^{th}$ data frame and the $M^{th}$ data frame. For example, M<N and 1≤N−M≤7, and this range indicates that the $N^{th}$ data frame and the $M^{th}$ data frame may be adjacent frames, or may be frames with a specific quantity of intervals.

Figure 6:
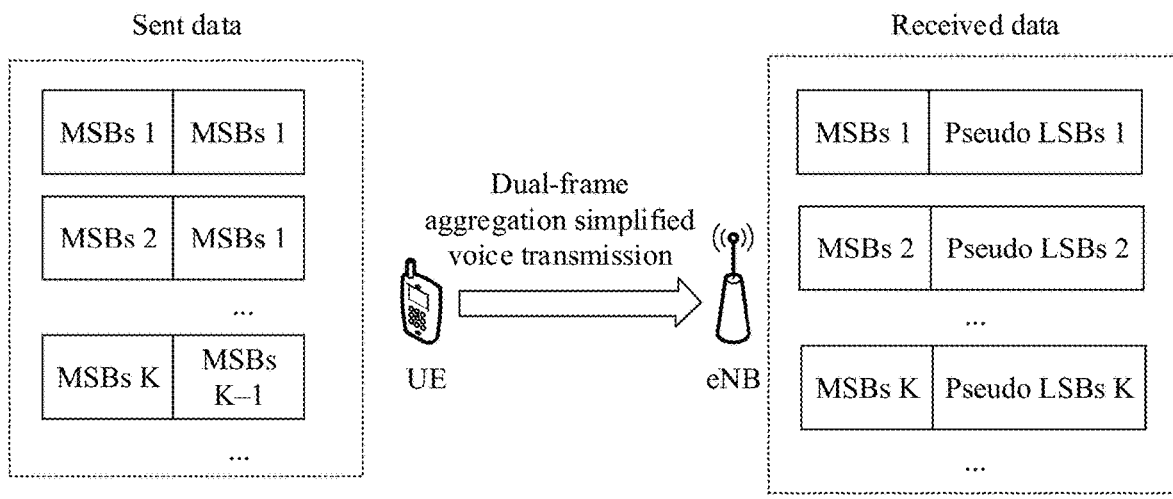
FIG. 6 is a schematic diagram of an example of dual-frame transmission according to an embodiment of this application.

For ease of understanding this embodiment by a person skilled in the art, the following describes this embodiment with reference to an example in FIG. 6.

FIG. 6 is a schematic diagram of an example of dual-frame transmission according to an embodiment of this application. As shown in FIG. 6, a UE side is used as a transmit end apparatus, and an eNB is used as a receive end apparatus. Data sent by UE includes MSBs of I aggregated frames, and each aggregated frame may be understood as a voice PDCP packet. If a current frame is a $K^{th}$ frame, an aggregated frame K includes significant bits (for example, MSBs K) of the $K^{th}$ frame and significant bits of a redundant frame, for example, significant bits (for example, MSBs K−1) of a $(K−1)^{th}$ frame, where K≤I. In other words, MSBs of the current frame and MSBs of the redundant frame are transmitted in each aggregated frame, and LSBs of the two frames are not transmitted. Correspondingly, using an aggregated frame formed by the MSBs K and the MSBs K−1 as an example, after correctly receiving the aggregated frame, the eNB may discard a redundantly transmitted part (that is, the MSBs K−1), and perform padding for untransmitted LSBs by using a random 0-1 sequence, that is, perform padding for the untransmitted LSBs by using pseudo LSBs K. Similarly, for MSBs 1, padding is performed for untransmitted LSBs by using pseudo LSBs 1, for MSBs 2, padding is performed for untransmitted LSBs by using pseudo LSBs 2, and so on, so as to form a data frame of a valid frame length. It should be noted that, the significant bits of the redundant frame are described by using the significant bits of the $(K−1)^{th}$ frame as an example, that is, the aggregated frame K includes the significant bits of the $K^{th}$ frame and the significant bits of the $(K−1)^{th}$ frame (that is, significant bits of an adjacent frame of the $K^{th}$ frame). However, this embodiment of this application is not limited thereto. The aggregated frame K may include the significant bits of the $K^{th}$ frame and significant bits of a $(K−O)^{th}$ frame, where O represents an offset frame quantity. In other words, the aggregated frame includes the MSBs K and MSBs K−O. A value of O may be another value. For example, the value of O may be any value in 1≤O≤7. The foregoing descriptions are provided by using an example in which the value of O is 1.

In addition, if the eNB fails to receive the aggregated frame K or fails to decode the MSBs K in the aggregated frame K although the eNB receives the aggregated frame K, the eNB may obtain the MSBs of the current frame from a next aggregated frame K+1, thereby better resisting a packet loss. For example, if the eNB fails to receive an aggregated frame formed by the MSBs K−1 and MSBs K−2, but successfully receives the aggregated frame formed by the MSBs K and the MSBs K−1, the eNB may use the aggregated frame formed by the MSBs K and the MSBs K−1 to obtain the MSBs K−1, and perform padding for untransmitted LSBs by using pseudo LSBs K−1 for the MSBs K−1, to obtain a data frame of a valid frame length.

In FIG. 6, because the first voice frame (that is, the first frame) does not have a previous frame, a redundant frame of the first voice frame is obtained by copying the first voice frame, that is, the first aggregated frame is formed by the MSBs 1 and the MSBs 1.

It should be understood that the examples in FIG. 4 to FIG. 6 are provided merely for helping a person skilled in the art understand the embodiments of this application, instead of limiting the embodiments of this application to specific scenarios shown in the examples. A person skilled in the art can apparently make various equivalent modifications or changes according to the examples shown in FIG. 4 to FIG. 6, and such modifications or changes also fall within the scope of the embodiments of this application.

In this embodiment of this application, indication information may be further introduced to indicate whether a data frame sent by the transmit end apparatus is a single frame or a dual frame. Optionally, the method 300 further includes the following step:

The transmit end apparatus sends the indication information, where the indication information is used to indicate that sent significant bits include the significant bits in the $N^{th}$ data frame, or sent significant bits include the significant bits in the $N^{th}$ data frame and the significant bits in the $M^{th}$ data frame. Correspondingly, the receive end apparatus receives the indication information.

That is, the transmit end apparatus sends the indication information to the receive end apparatus, so that the receive end apparatus learns of whether the data frame sent by the transmit end apparatus is a single frame or a dual frame, so as to perform corresponding processing.

Optionally, the indication information may be carried in the data frame. For example, the indication information may be carried in an RTP payload header.

Alternatively, in an optional manner, the transmit end apparatus and the receive end apparatus may predetermine whether a to-be-sent data frame is a single frame or a dual frame. For example, the two parties may agree on the data frame in a session initiation protocol (SIP), or may agree on the data frame at another proper stage. This is not specifically limited.

For ease of understanding by a person skilled in the art, the following provides descriptions with reference to simulation results in FIG. 7 to FIG. 11.

Figure 7:
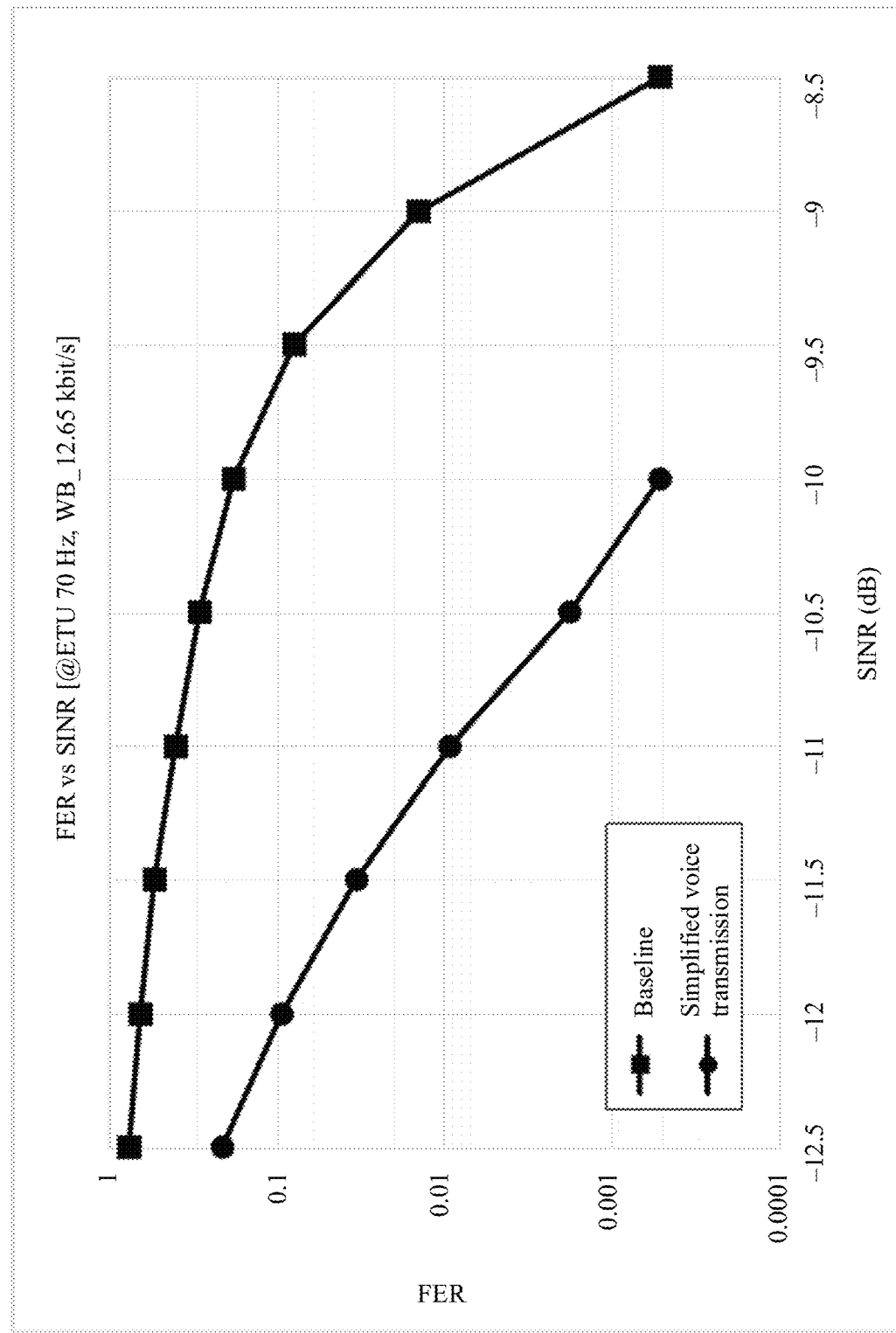
FIG. 7 is a schematic diagram of a simulation result according to an embodiment of this application.
Figure 8:
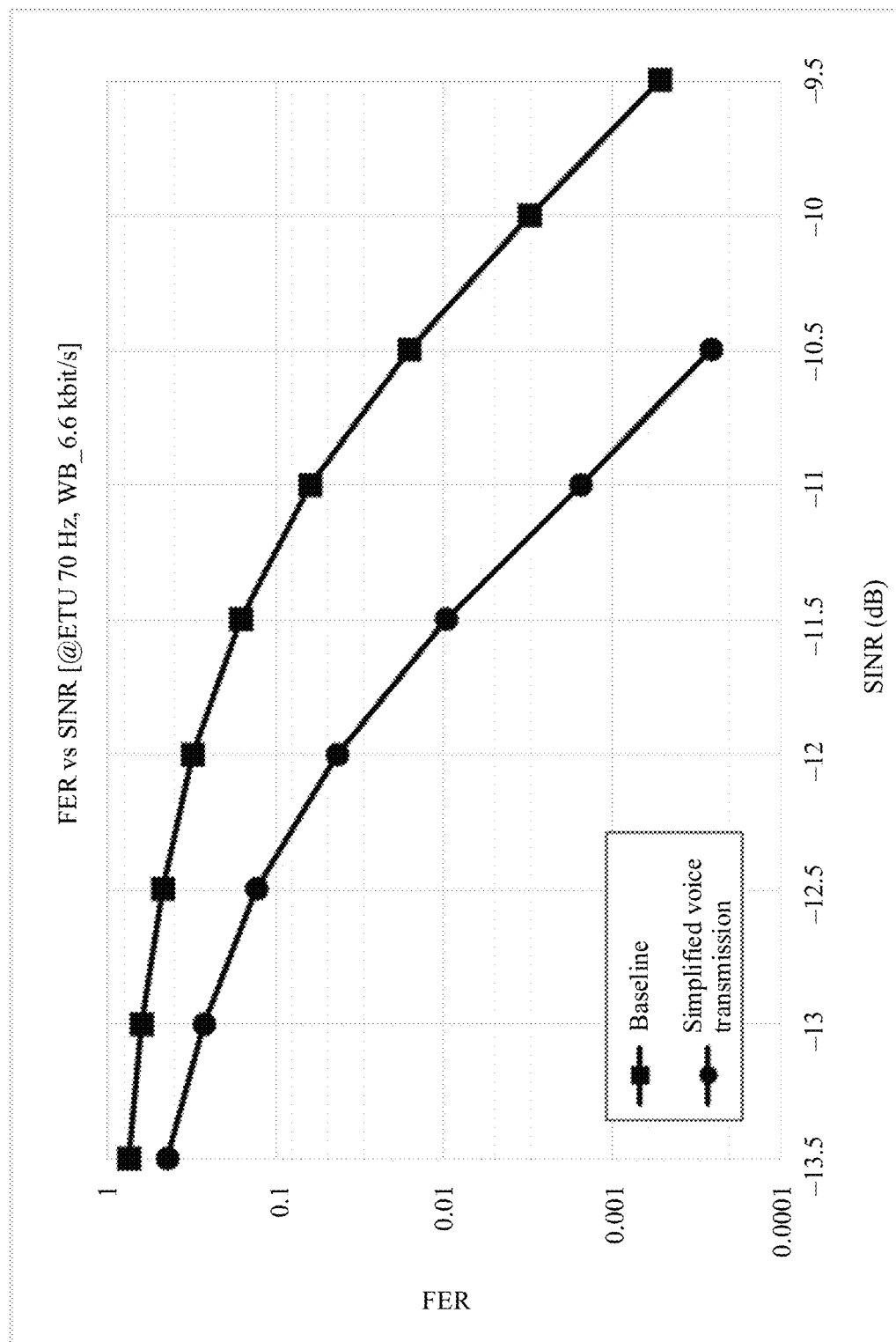
FIG. 8 is a schematic diagram of another simulation result according to an embodiment of this application.
Figure 9:
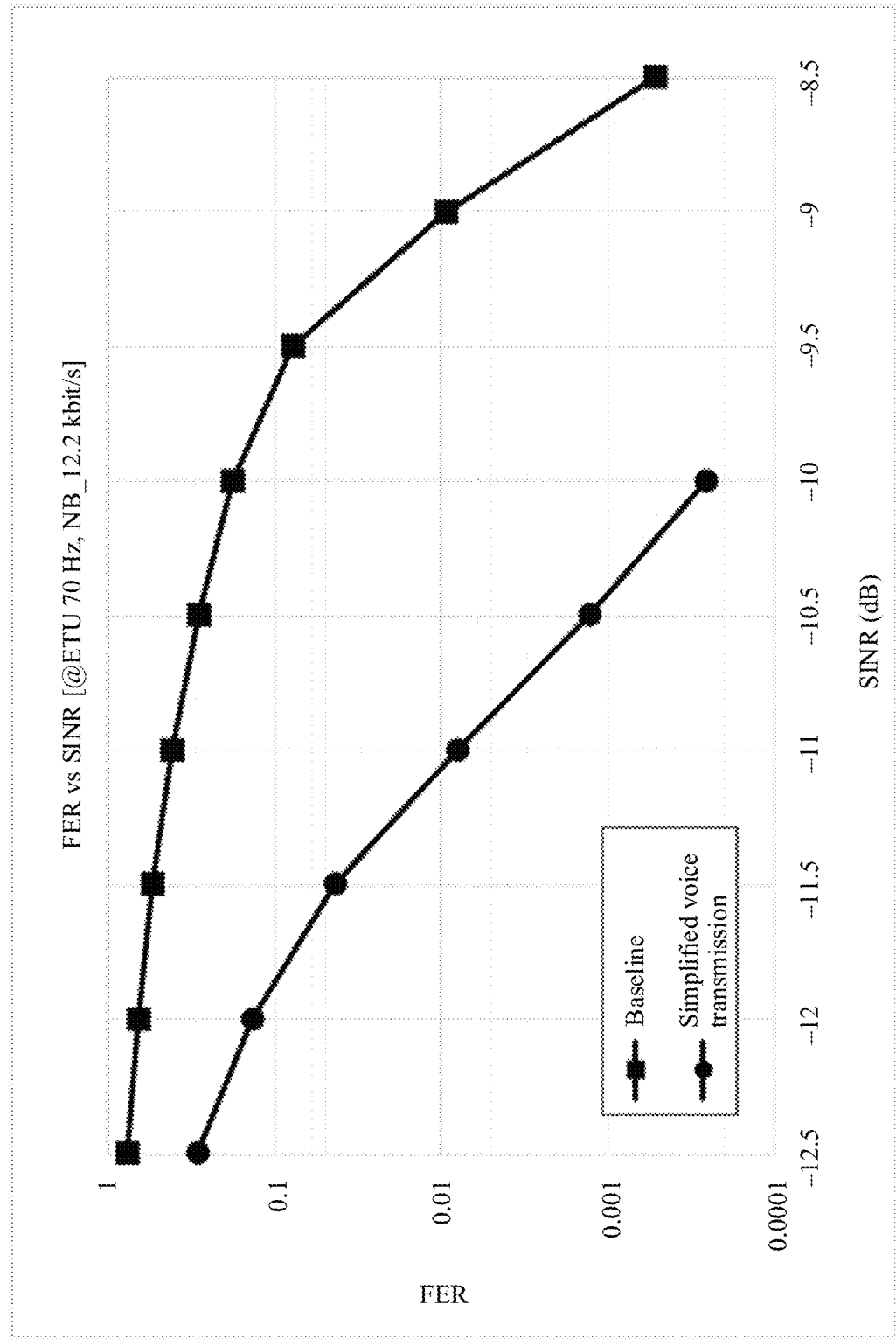
FIG. 9 is a schematic diagram of still another simulation result according to an embodiment of this application.

For example, simulation conditions in FIG. 7 to FIG. 11 are an extended typical urban model (ETU) 70 Hz channel, one transmit antenna and two receive antennas, that RoHC and TTI bundling functions are enabled, that a maximum quantity of HARQ retransmission times is 6, that a quantity of used RBs is 2, and adaptive RLC segmentation (three segments are obtained through division on average near a working point at which an FER is 1%). A horizontal coordinate indicates a signal to interference plus noise ratio (SINR), a vertical coordinate indicates a frame error ratio (FER), and a MOS of 3 is used as a benchmark to compare differences among working points. FIG. 7 is a schematic diagram of a simulation result of single-frame simplified voice transmission according to an embodiment of this application. Voice rates WB 12.65 kbit/s, WB 6.6 kbit/s, and NB 12.2 kbit/s which are most commonly used by operators at a coverage edge are selected, and Table 3 lists coverage gains of simplified voice transmission at the three rates. Corresponding simulation results are shown in FIG. 7 to FIG. 9.

TABLE 3

| Voice rate | Baseline at an FER = 1% working point (dB) | Single-frame simplified voice at the FER = 1% working point (dB) | Coverage gain (dB) |
| --- | --- | --- | --- |
| WB 12.65 kbit/s | −8.9 | −11 | 2.1 |
| WB 6.6 kbit/s | −10.3 | −11.5 | 1.2 |
| NB 12.2 kbit/s | −9 | −11.1 | 2.1 |

FIG. 7 shows a simulation result of single-frame simplified voice transmission when the voice rate is WB 12.65 kbit/s and a simulation result of a baseline. It can be learned from the simulation result in FIG. 7 that an SINR corresponding to the baseline at the working point at which the FER is 1% is −8.9 dB, an SINR corresponding to the single-frame simplified voice at the working point at which the FER is 1% is −11 dB, and compared with the baseline, the single-frame simplified voice transmission has an obvious coverage gain, that is, 2.1 dB.

FIG. 8 shows a simulation result of single-frame simplified voice transmission when the voice rate is WB 6.6 kbit/s and a simulation result of a baseline. It can be learned from the simulation result in FIG. 8 that an SINR corresponding to the baseline at the working point at which the FER is 1% is −10.3 dB, an SINR corresponding to the single-frame simplified voice at the working point at which the FER is 1% is −11.5 dB, and compared with the baseline, the single-frame simplified voice transmission has an obvious coverage gain, that is, 1.2 dB.

FIG. 9 shows a simulation result of single-frame simplified voice transmission when the voice rate is NB 12.2 kbit/s and a simulation result of a baseline. It can be learned from the simulation result in FIG. 9 that an SINR corresponding to the baseline at the working point at which the FER is 1% is −9 dB, an SINR corresponding to the single-frame simplified voice at the working point at which the FER is 1% is −11.1 dB, and compared with the baseline, the single-frame simplified voice transmission has an obvious coverage gain, that is, 2.1 dB.

In conclusion, it can be learned from the simulation results in FIG. 7 to FIG. 9 that compared with the baseline, the single-frame simplified voice transmission has an obvious coverage gain, and a higher source coding rate indicates a larger coverage gain of the single-frame simplified voice. In addition, the RLC segmentation is used in the foregoing simulation process (where the RLC segmentation is also used in a case on a live network), and more overheads of MAC and RLC headers are introduced during data transmission. Therefore, a simulation gain is lower than a theoretical gain.

Figure 10:
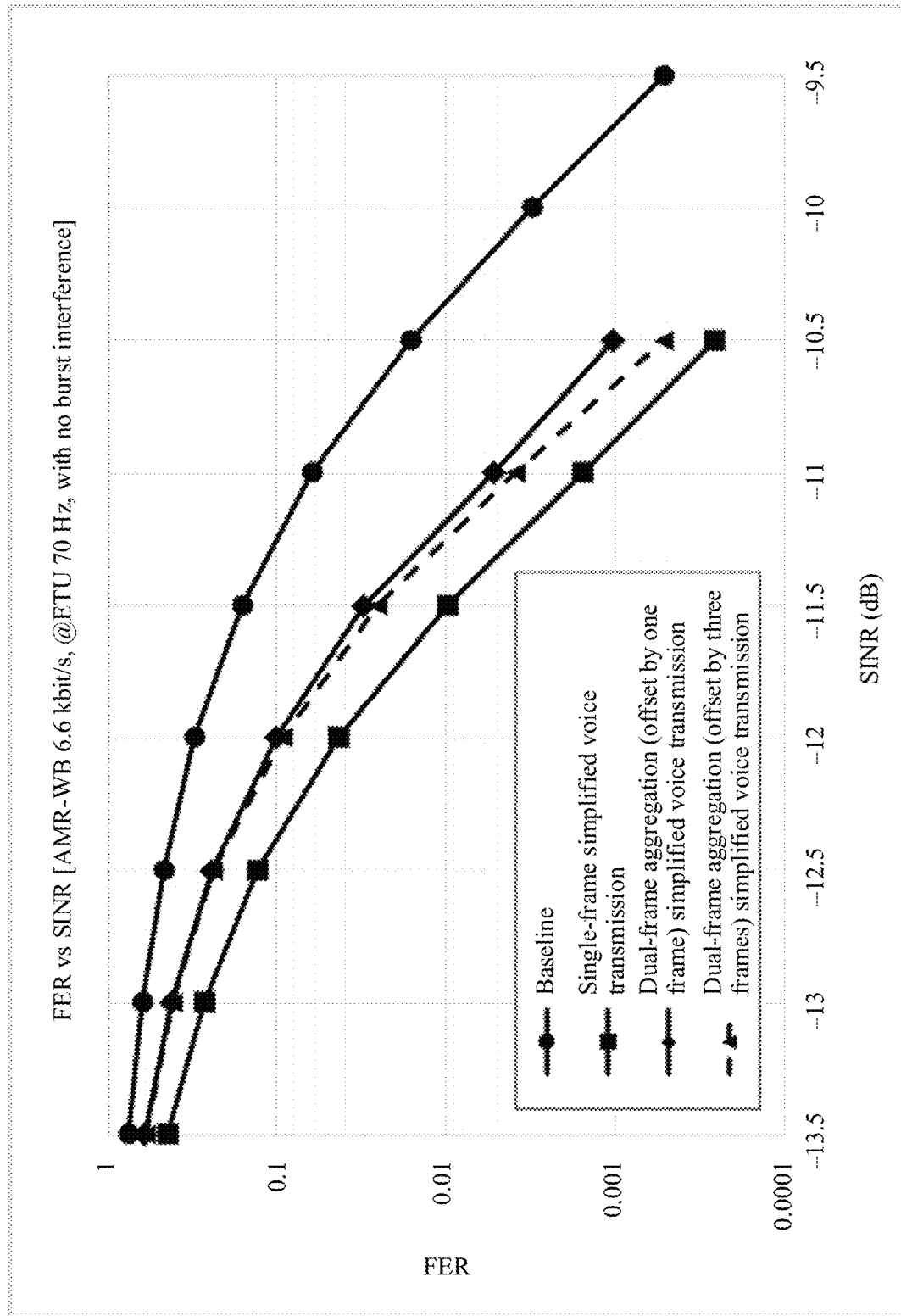
FIG. 10 is a schematic diagram of yet another simulation result according to an embodiment of this application.
Figure 11:
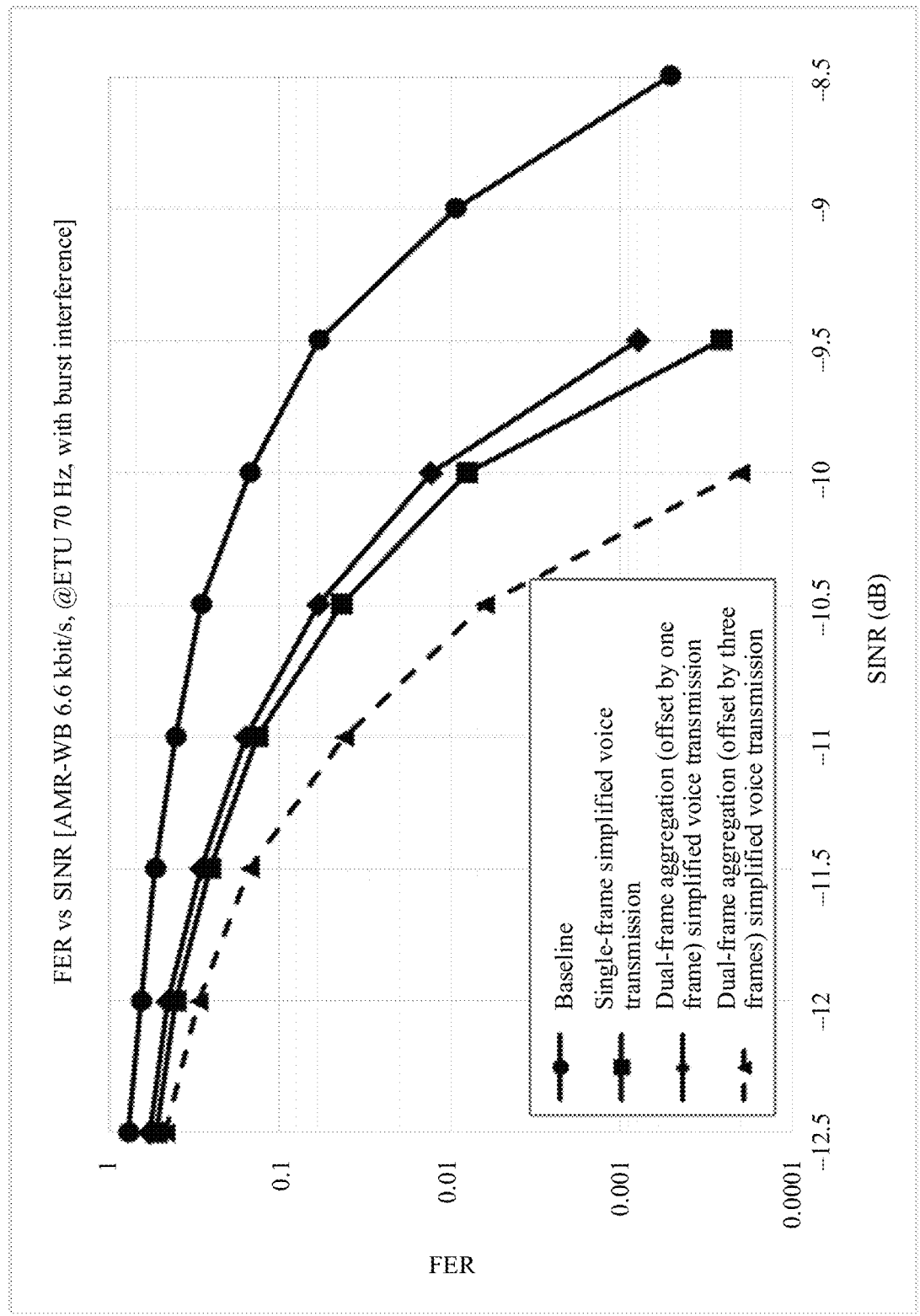
FIG. 11 is a schematic diagram of still yet another simulation result according to an embodiment of this application.

The following describes diagrams of simulation results of dual-frame aggregation simplified voice transmission with reference to FIG. 10 and FIG. 11. In FIG. 10 and FIG. 11, simulation is performed at the voice rate of WB 6.6 kbit/s.

FIG. 10 is a diagram of a simulation result of dual-frame aggregation simplified voice transmission without burst interference. As shown in FIG. 10, an SINR corresponding to dual-frame aggregation simplified voice with an offset frame quantity of 1 at a working point at which an FER is 1% is −11.1 dB, and an SINR corresponding to a baseline at the working point at which the FER is 1% is −10.4 dB. Therefore, coverage of the dual-frame aggregation simplified voice transmission is 0.7 dB better than that of the baseline. In addition, FIG. 10 separately shows an aggregated frame with an offset frame quantity of 1 (that is, aggregation of adjacent frames) and an aggregated frame with an offset frame quantity of 3. Because when there is no burst interference, a single frame is mainly lost is, a difference between the aggregated frame with the offset frame quantity of 1 and the aggregated frame with the offset frame quantity of 3 is not obvious. Because a payload of a dual-frame aggregated frame is twice as large as a payload of a single frame, coverage of the single frame is far greater than coverage of the aggregated frame.

FIG. 11 is a diagram of a simulation result of dual-frame aggregation simplified voice transmission with burst interference. When burst interference exists, a case in which two or three frames are continuously lost increases significantly, and a dual-frame aggregated frame with an offset frame quantity of 3 can improve a case in which a quantity of consecutive lost frames does not exceed 3. Therefore, robustness of resisting continuously losing frames is greatly enhanced. As shown in FIG. 11, an SINR corresponding to dual-frame aggregation simplified voice transmission with an offset frame quantity of 3 at a working point at which an FER is 1% is −10.6 dB, and an SINR corresponding to single-frame simplified voice transmission at the working point at which the FER is 1% is −10.1 dB. Therefore, coverage of the dual-frame aggregation simplified voice transmission with the offset frame quantity of 3 is 0.5 dB better than that of the single-frame simplified voice transmission. In addition, the more the offset frames are, the stronger an anti-burst interference capability is. However, an end-to-end delay and jitter are also greater. Therefore, an offset length needs to be properly selected in practice, for example, a value of the offset frame quantity may be any value from 1 to 7 (including endpoints at both ends).

In conclusion, it can be learned from the simulation results in FIG. 7 to FIG. 11 that, in a scenario in which there is no burst interference and a single frame is mainly lost, an advantage of a dual-frame aggregated frame is not obvious, and therefore single-frame transmission may be used; and in a scenario in which there is burst interference and consecutive frames are mainly lost, the dual-frame aggregated frame may be used.

Optionally, in this embodiment of this application, a robust header compression RoHC function may be used (where for a detailed implementation of the function, refer to descriptions in the prior art). The RoHC function may significantly reduce header overheads. A coverage gain is closely related to a header length (a PDCP header length+an IP header length+a UDP header length+an RTP header length) of a PDCP data packet. The shorter the header length, the greater the coverage gain. Therefore, in a device-pipe synergy architecture, an eRoHC standard may be used to further reduce the header overheads and minimize an amount of sent data.

It should be understood that the simulation results in FIG. 7 to FIG. 11 are merely intended to help a person skilled in the art understand the solutions in the embodiments of this application, but are not intended to limit a specific parameter used in a simulation process or simulation. A person skilled in the art may use different simulation parameters for verification. This is not limited.

The following describes technical effects of this embodiment of this application with reference to data in Table 4. For example, if an original amount of sent data (including a payload and a header) of a transmit end apparatus is X bits, and an amount of sent data is Y after the transmission solution (namely, simplified voice transmission) in this embodiment of this application is used, after the technical solution in this embodiment of this application is applied, an increase of an uplink coverage gain may be approximately estimated as 20 lg(X/Y) dB. It is assumed that each voice PDCP packet is not segmented. According to the formula 20 lg(X/Y) dB, theoretical coverage gains of the AMR vocoder at medium and low rates are calculated when there is no RLC segmentation, as shown in the following Table 4.

TABLE 4

Theoretical estimation of coverage gains at encoding rates commonly used for an AMR vocoder when there is no RLC segmentation (unit: bit)

| Encoding rate | MAC &RLC | PDCP& RoHC | RTP payload header | Voice payload | MSB | Original voice data volume of each frame (including padding bits) | Simplified voice data volume of each frame (including padding bits) | Theoretical coverage gain |
|---|---|---|---|---|---|---|---|---|
| WB-12.65 kbit/s | 32 | 40 | 10 | 253 | 72 | 336 | 160 | 3.2 dB |
| WB-6.6 kbit/s | | | | 132 | 54 | 216 | 136 | 2.0 dB |
| NB-12.2 kbit/s | | | | 244 | 81 | 312 | 168 | 2.7 dB |
| NB-4.75 kbit/s | | | | 95 | 42 | 180 | 128 | 1.5 dB |

If the technical solution in this embodiment of this application is used, at a minimum encoding rate of a vocoder, uplink voice coverage is improved by at least 1 dB to 2 dB compared with a baseline. Because with a same path loss, a packet loss rate of a coverage edge is far lower than a baseline level, the technical solution in this embodiment of this application makes a call possible in a path loss area in which an original packet loss rate is very high (an FER>10%) or even a call drop area, and does not affect semantic understanding and information exchange. Therefore, the technical solution in this embodiment of this application is of great significance in special occasions such as an emergency call, emergency site deployment for contact, and urgent rescue and relief.

The foregoing describes in detail the data transmission method according to the embodiments of this application with reference to FIG. 1 to FIG. 11. The following describes a data communication apparatus according to the embodiments of this application with reference to FIG. 12 to FIG. 15. It should be understood that the technical features described in the method embodiments are also applicable to the following apparatus embodiments.

Figure 12:
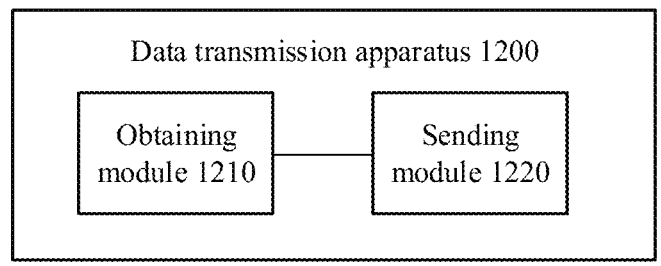
FIG. 12 is a schematic block diagram of a data transmission apparatus according to an embodiment of this application.

FIG. 12 is a schematic block diagram of a data transmission apparatus 1200 according to an embodiment of this application. The apparatus 1200 is a transmit end apparatus. Optionally, the apparatus 1200 may be a chip located in a communications apparatus. As shown in FIG. 12, the apparatus 1200 includes:

an obtaining module 1210, configured to obtain significant bits in an $N^{th}$ data frame, where N is an integer greater than or equal to 1, a quantity of the significant bits in the $N^{th}$ data frame is smaller than a quantity of bits in the $N^{th}$ data frame, and remaining bits other than the significant bits in the $N^{th}$ data frame are insignificant bits in the $N^{th}$ data frame; and a sending module 1220, configured to: send the significant bits in the $N^{th}$ data frame, and skip sending the insignificant bits in the $N^{th}$ data frame.

In an optional implementation, the obtaining module 1210 is further configured to:

obtain significant bits in an $M^{th}$ data frame, where M is an integer greater than or equal to 1 and less than or equal to N, a quantity of the significant bits in the $M^{th}$ data frame is smaller than a quantity of bits in the $M^{th}$ data frame, and remaining bits other than the significant bits in the $M^{th}$ data frame are insignificant bits in the $M^{th}$ data frame; and the sending module 1220 is specifically configured to:

send the significant bits in the $N^{th}$ data frame and the significant bits in the $M^{th}$ data frame, and skip sending the insignificant bits in the $N^{th}$ data frame and the insignificant bits in the $M^{th}$ data frame.

Optionally, the significant bits in the data frame are bits, corresponding to preset distortion information, in the data frame.

Optionally, the $N^{th}$ data frame is the first frame, where M=N=1; or the $N^{th}$ data frame is not the first frame, where M<N and $1 \leq N-M \leq 7$.

In an optional implementation, the $N^{th}$ data frame is a voice frame, or both the $N^{th}$ data frame and the $M^{th}$ data frame are voice frames.

In an optional implementation, the $N^{th}$ data frame is an adaptive multi-rate AMR voice frame, and the significant bits in the $N^{th}$ data frame are a class A subflow in the $N^{th}$ data frame; or the $M^{th}$ data frame is an adaptive multi-rate AMR voice frame, and the significant bits in the $M^{th}$ data frame are a class A subflow in the $M^{th}$ data frame.

Optionally, the $N^{th}$ data frame is an enhanced voice service EVS frame, and the preset distortion information is a mean opinion score MOS value; or the $M^{th}$ data frame is an EVS frame, and the preset distortion information is a mean opinion score MOS value.

In an optional implementation, the sending module 1220 is further configured to:

send indication information, where the indication information is used to indicate that sent significant bits include the significant bits in the $N^{th}$ data frame, or sent significant bits include the significant bits in the $N^{th}$ data frame and the significant bits in the $M^{th}$ data frame.

It should be understood that the apparatus 1200 according to this embodiment of this application may correspond to the method on the transmit end apparatus side in the foregoing method embodiments (including the method in FIG. 3), and the foregoing and other management operations and/or functions of the modules in the apparatus 1200 are separately used to implement corresponding steps of the foregoing methods. Therefore, beneficial effects in the foregoing method embodiments can also be implemented. For brevity, details are not described herein.

Figure 13:
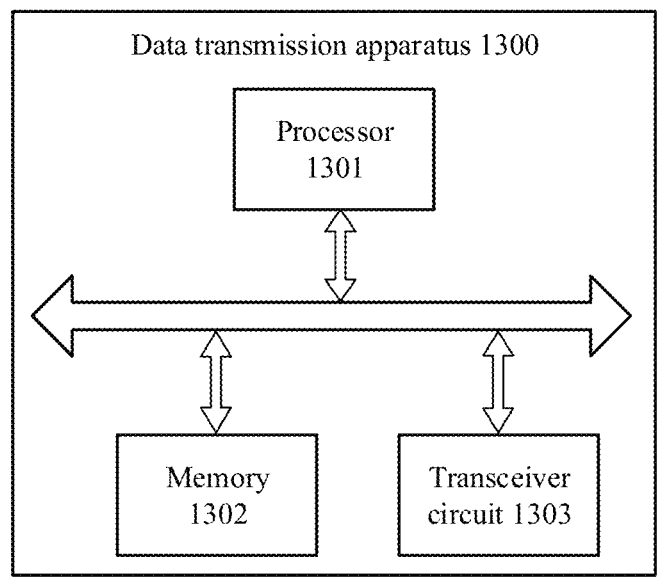
FIG. 13 is a schematic structural diagram of a data transmission apparatus according to an embodiment of this application.

FIG. 13 is a schematic structural diagram of a data transmission apparatus 1300 according to an embodiment of this application. Optionally, a terminal device may include the apparatus 1300. As shown in FIG. 13, the apparatus 1300 includes:

a processor 1301, a memory 1302, and a transceiver circuit 1303.

The processor 1301, the memory 1302, and the transceiver circuit 1303 communicate with each other through an internal connection path, to transfer a control and/or data signal. In a possible design, the processor 1301, the memory 1302, and the transceiver circuit 1303 may be implemented by a chip. The memory 1302 may store program code, and the processor 1301 invokes the program code stored in the memory 1302, to implement a corresponding function of a transmit end apparatus.

The processor 1301 is configured to obtain significant bits in an $N^{th}$ data frame, where N is an integer greater than or equal to 1, a quantity of the significant bits in the $N^{th}$ data frame is smaller than a quantity of bits in the $N^{th}$ data frame, and remaining bits other than the significant bits in the $N^{th}$ data frame are insignificant bits in the $N^{th}$ data frame.

The transceiver circuit 1303 is configured to: send the significant bits in the $N^{th}$ data frame, and skip sending the insignificant bits in the $N^{th}$ data frame.

Optionally, the sending module 1220 in the apparatus 1200 shown in FIG. 12 may also correspond to the transceiver circuit 1303 in the apparatus 1300 shown in FIG. 13, and the obtaining module 1210 may correspond to the processor 1301 in the apparatus 1300 shown in FIG. 13.

A transceiver module (which may include a receiving module and a sending module) or the transceiver circuit is an interface circuit of the apparatus, and is configured to receive a signal from another apparatus or send a signal to another apparatus. For example, when the apparatus is implemented as a chip, the transceiver module or the transceiver circuit is an interface circuit that is of the chip and that is configured to receive a signal from another chip or apparatus or send a signal to another chip or apparatus.

In this embodiment of this application, the apparatus 1300 may be a chip (or a chip system) installed in a transmit end apparatus (for example, a terminal device). In this case, the apparatus 1200 may include a processor and an input/output interface. The processor and a transceiver of a radio access network device may be in communication connection through the input/output interface. Optionally, the apparatus further includes a memory, and the memory and the processor are in communication connection. Optionally, the processor, the memory, and the transceiver circuit may be in communication connection. The memory may be configured to store an instruction. The processor is configured to execute the instruction stored in the memory, to control the transceiver circuit to send information or a signal.

It should be understood that the apparatus 1300 according to this embodiment of this application may correspond to the method on the transmit end apparatus side in the foregoing method embodiments.

Figure 14:
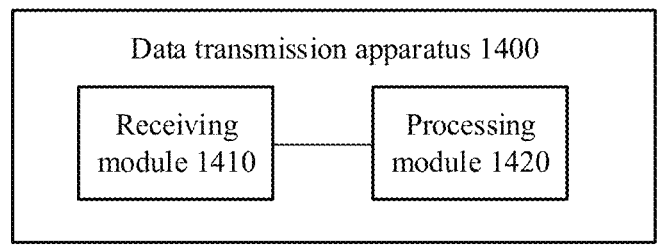
FIG. 14 is a schematic block diagram of a data transmission apparatus according to another embodiment of this application.

FIG. 14 is a schematic block diagram of a data transmission apparatus 1400 according to an embodiment of this application. The apparatus 1400 is a receive end apparatus. Optionally, the apparatus 1400 may be a chip located in a communications apparatus. As shown in FIG. 14, the apparatus 1400 includes:

a receiving module 1410, configured to receive significant bits in an $N^{th}$ data frame, where N is an integer greater than or equal to 1, a quantity of the significant bits in the $N^{th}$ data frame is smaller than a quantity of bits in the $N^{th}$ data frame, and remaining bits other than the significant bits in the $N^{th}$ data frame are insignificant bits in the $N^{th}$ data frame; and a processing module 1420, configured to obtain an $N^{th}$ to-be-decoded data frame based on the significant bits in the $N^{th}$ data frame, where the $N^{th}$ to-be-decoded data frame includes the significant bits in the $N^{th}$ data frame.

In an optional implementation, the $N^{th}$ to-be-decoded data frame further includes padding bits.

In an optional implementation, the receiving module 1410 is specifically configured to:

receive the significant bits in the $N^{th}$ data frame and significant bits in an $M^{th}$ data frame, where M is an integer greater than or equal to 1 and less than or equal to N, a quantity of the significant bits in the $M^{th}$ data frame is smaller than a quantity of bits in the $M^{th}$ data frame, and remaining bits other than the significant bits in the $M^{th}$ data frame are insignificant bits in the $M^{th}$ data frame; and the processing module 1420 is further configured to:

obtain an $M^{th}$ to-be-decoded data frame based on the significant bits in the $M^{th}$ data frame.

In an optional implementation, the $M^{th}$ to-be-decoded data frame further includes padding bits.

Optionally, the $N^{th}$ data frame is the first frame, where M=N=1; or the $N^{th}$ data frame is not the first frame, where M<N and $1 \leq N-M \leq 7$.

In an optional implementation, the $N^{th}$ data frame is a voice frame, or both the $N^{th}$ data frame and the $M^{th}$ data frame are voice frames.

Optionally, the $N^{th}$ data frame is an adaptive multi-rate AMR voice frame, and the significant bits in the $N^{th}$ data frame are a class A subflow in the $N^{th}$ data frame; or the $M^{th}$ data frame is an adaptive multi-rate AMR voice frame, and the significant bits in the $M^{th}$ data frame are a class A subflow in the $M^{th}$ data frame.

Optionally, the $N^{th}$ data frame is an enhanced voice service EVS frame, and preset distortion information is a mean opinion score MOS value; or the $M^{th}$ data frame is an EVS frame, and the preset distortion information is a mean opinion score MOS value.

In an optional implementation, the receiving module 1410 is further configured to: receive indication information, where the indication information is used to indicate that received significant bits include the significant bits in the $N^{th}$ data frame, or received significant bits include the significant bits in the $N^{th}$ data frame and the significant bits in the $M^{th}$ data frame.

It should be understood that the apparatus 1400 according to this embodiment of this application may correspond to the method on the receive end apparatus side in the foregoing method embodiments (including the method in FIG. 3), and the foregoing and other management operations and/or functions of the modules in the apparatus 1400 are separately used to implement corresponding steps of the foregoing methods. Therefore, beneficial effects in the foregoing method embodiments can also be implemented. For brevity, details are not described herein.

Figure 15:
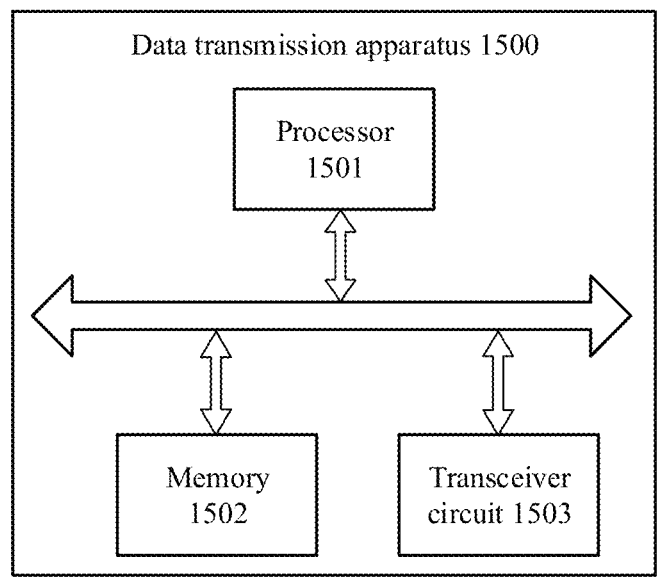
FIG. 15 is a schematic structural diagram of a data transmission apparatus according to another embodiment of this application.

FIG. 15 is a schematic structural diagram of a data transmission apparatus 1500 according to an embodiment of this application. Optionally, a terminal device may include the apparatus 1500. As shown in FIG. 15, the apparatus 1500 includes:

a processor 1501, a memory 1502, and a transceiver circuit 1503.

The processor 1501, the memory 1502, and the transceiver circuit 1503 communicate with each other through an internal connection path, to transfer a control and/or data signal. In a possible design, the processor 1501, the memory 1502, and the transceiver circuit 1503 may be implemented by a chip. The memory 1502 may store program code, and the processor 1501 invokes the program code stored in the memory 1502, to implement a corresponding function of a receive end apparatus.

The transceiver circuit 1503 is configured to receive significant bits in an $N^{th}$ data frame, where N is an integer greater than or equal to 1, a quantity of the significant bits in the $N^{th}$ data frame is smaller than a quantity of bits in the $N^{th}$ data frame, and remaining bits other than the significant bits in the $N^{th}$ data frame are insignificant bits in the $N^{th}$ data frame.

The processor 1501 is configured to obtain an $N^{th}$ to-be-decoded data frame based on the significant bits in the $N^{th}$ data frame, where the $N^{th}$ to-be-decoded data frame includes the significant bits in the $N^{th}$ data frame.

Optionally, the receiving module 1410 in the apparatus 1400 shown in FIG. 14 may also correspond to the transceiver circuit 1503 in the apparatus 1500 shown in FIG. 15, and the processing module 1420 may correspond to the processor 1501 in the apparatus 1500 shown in FIG. 15.

A transceiver module (which may include a receiving module and a sending module) or the transceiver circuit is an interface circuit of the apparatus, and is configured to receive a signal from another apparatus or send a signal to another apparatus. For example, when the apparatus is implemented as a chip, the transceiver module or the transceiver circuit is an interface circuit that is of the chip and that is configured to receive a signal from another chip or apparatus or send a signal to another chip or apparatus.

In this embodiment of this application, the apparatus 1500 may be a chip (or a chip system) installed in a receive end apparatus (for example, a radio access network device). In this case, the apparatus 1500 may include a processor and an input/output interface. The processor and a transceiver of the terminal device may be in communication connection through the input/output interface. Optionally, the apparatus further includes a memory, and the memory and the processor are in communication connection. Optionally, the processor, the memory, and the transceiver circuit may be in communication connection. The memory may be configured to store an instruction. The processor is configured to execute the instruction stored in the memory, to control the transceiver circuit to send information or a signal.

It should be understood that the apparatus 1500 according to this embodiment of this application may correspond to the method on the receive end apparatus side in the foregoing method embodiments.

It should be further understood that, for the transmit end apparatus 1200 and the receive end apparatus 1400, the apparatus 1200 is a terminal device, and correspondingly, the apparatus 1400 is a radio access network device. Alternatively, the apparatus 1200 is a radio access network device, and correspondingly, the apparatus 1400 is a terminal device.

The method disclosed in the embodiments of this application may be applied to a processor or may be implemented by a processor. The processor may be an integrated circuit chip and has a signal processing capability. In an implementation process, steps in the foregoing method embodiments can be implemented by using a hardware integrated logic circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, a discrete hardware component, a system on chip (SoC), a central processing unit (CPU), a network processor (NP), a digital signal processing circuit (DSP), a micro controller unit (MCU), or a programmable controller (PLD) or another integrated chip. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method applied to a data transmission apparatus, the method comprising:
    obtaining significant bits in an $N^{th}$ data frame, including:
        comparing an inverted bit in the $N^{th}$ data frame with a filtering threshold, and
        determining the inverted bit whose mean opinion score (MOS) decrease exceeds the filtering threshold as a significant bit, wherein the filtering threshold is a special MOS value or a MOS value range;
        wherein N is an integer greater than or equal to 1, a quantity of the significant bits in the $N^{th}$ data frame is less than a quantity of bits in the $N^{th}$ data frame, and remaining bits other than the significant bits in the $N^{th}$ data frame are insignificant bits in the $N^{th}$ data frame; and
    sending the significant bits in the $N^{th}$ data frame, and skipping sending the insignificant bits in the $N^{th}$ data frame.

2. The method according to claim 1, further comprising:
    obtaining significant bits in an $M^{th}$ data frame, wherein M is an integer greater than or equal to 1 and less than or equal to N, a quantity of the significant bits in the $M^{th}$ data frame is less than a quantity of bits in the $M^{th}$ data frame, and remaining bits other than the significant bits in the $M^{th}$ data frame are insignificant bits in the $M^{th}$ data frame; and
    wherein the sending the significant bits in the $N^{th}$ data frame and skipping sending the insignificant bits in the $N^{th}$ data frame comprise:
    sending the significant bits in the $N^{th}$ data frame and the significant bits in the $M^{th}$ data frame, and skipping sending the insignificant bits in the Nth data frame and the insignificant bits in the $M^{th}$ data frame.

3. The method according to claim 2, wherein the significant bits in the data frame are bits, corresponding to preset distortion information, in the data frame.

4. The method according to claim 3, wherein the $N^{th}$ data frame is the first frame, wherein M=N=1; or the $N^{th}$ data frame is not the first frame, wherein M<N and 1≤N−M≤7.

5. The method according to claim 4, wherein the $N^{th}$ data frame is a voice frame, or both the $N^{th}$ data frame and the $M^{th}$ data frame are voice frames.

6. The method according to claim 5, wherein the $N^{th}$ data frame is an adaptive multi-rate (AMR) voice frame, and the significant bits in the $N^{th}$ data frame are a class A subflow in the $N^{th}$ data frame; or
    the $M^{th}$ data frame is an AMR voice frame, and the significant bits in the $M^{th}$ data frame are a class A subflow in the $M^{th}$ data frame.

7. The method according to claim 5, wherein the $N^{th}$ data frame is an enhanced voice service (EVS) frame, and the preset distortion information is a MOS value; or
    the $M^{th}$ data frame is an EVS frame, and the preset distortion information is a MOS value.

8. The method according to claim 7, further comprising:
    sending indication information, wherein the indication information indicates that the significant bits that are sent comprise one of the following: (a) the significant bits in the $N^{th}$ data frame, or (b) both the significant bits in the $N^{th}$ data frame and the significant bits in the $M^{th}$ data frame.

9. A data transmission apparatus comprising:
    a processor; and
    a non-transitory computer-readable storage medium coupled to the processor and storing programming instructions for execution by the processor, the programming instructions when executed by the processor instruct the processor to:
    obtain significant bits in an $N^{th}$ data frame, including:
        comparing an inverted bit in the $N^{th}$ data frame with a filtering threshold, and
        determining the inverted bit whose mean opinion score (MOS) decrease exceeds the filtering threshold as a significant bit, wherein the filtering threshold is a special MOS value or a MOS value range;
        wherein N is an integer greater than or equal to 1, a quantity of the significant bits in the $N^{th}$ data frame is less than a quantity of bits in the $N^{th}$ data frame, and remaining bits other than the significant bits in the $N^{th}$ data frame are insignificant bits in the $N^{th}$ data frame; and
    send the significant bits in the $N^{th}$ data frame, and skip sending the insignificant bits in the $N^{th}$ data frame.

10. The apparatus according to claim 9, wherein the programming instructions further instruct the processor to:
    obtain significant bits in an $M^{th}$ data frame, wherein M is an integer greater than or equal to 1 and less than or equal to N, a quantity of the significant bits in the $M^{th}$ data frame is less than a quantity of bits in the $M^{th}$ data frame, and remaining bits other than the significant bits in the $M^{th}$ data frame are insignificant bits in the $M^{th}$ data frame; and
    send the significant bits in the $N^{th}$ data frame and the significant bits in the $M^{th}$ data frame, and skip sending the insignificant bits in the $N^{th}$ data frame and the insignificant bits in the $M^{th}$ data frame.

11. The apparatus according to claim 10, wherein the significant bits in the data frame are bits, corresponding to preset distortion information, in the data frame.

12. The apparatus according to claim 11, wherein the $N^{th}$ data frame is the first frame, wherein M=N=1; or the $N^{th}$ data frame is not the first frame, wherein M<N and 1≤N−M≤7.

13. The apparatus according to claim 12, wherein the $N^{th}$ data frame is a voice frame, or both the $N^{th}$ data frame and the $M^{th}$ data frame are voice frames.

14. The apparatus according to claim 13, wherein the $N^{th}$ data frame is an adaptive multi-rate (AMR) voice frame, and the significant bits in the $N^{th}$ data frame are a class A subflow in the $N^{th}$ data frame; or
the $M^{th}$ data frame is an AMR voice frame, and the significant bits in the $M^{th}$ data frame are a class A subflow in the $M^{th}$ data frame.

15. The apparatus according to claim 14, wherein the $N^{th}$ data frame is an enhanced voice service (EVS) frame, and the preset distortion information is a MOS value; or
the $M^{th}$ data frame is an EVS frame, and the preset distortion information is a MOS value.

16. The apparatus according to claim 15, wherein the programming instructions further instruct the processor to:
send indication information, wherein the indication information indicates that the significant bits that are sent comprise one of the following: (a) the significant bits in the $N^{th}$ data frame, or (b) both the significant bits in the $N^{th}$ data frame and the significant bits in the $M^{th}$ data frame.

17. A non-transitory computer readable medium comprising computer-executable instructions stored thereon, which when executed by a processor of a data transmission apparatus, cause the data transmission apparatus to implement a data transmission method, the method comprising:
obtaining significant bits in an $N^{th}$ data frame, including:
comparing an inverted bit in the $N^{th}$ data frame with a filtering threshold, and
determining the inverted bit whose mean opinion score (MOS) decrease exceeds the filtering threshold as a significant bit, wherein the filtering threshold is a special MOS value or a MOS value range;
wherein N is an integer greater than or equal to 1, a quantity of the significant bits in the $N^{th}$ data frame is less than a quantity of bits in the $N^{th}$ data frame, and remaining bits other than the significant bits in the $N^{th}$ data frame are insignificant bits in the $N^{th}$ data frame; and
sending the significant bits in the $N^{th}$ data frame, and skipping sending the insignificant bits in the $N^{th}$ data frame.

18. The non-transitory computer readable medium according to claim 17, wherein the method further comprises:
obtaining significant bits in an $M^{th}$ data frame, wherein M is an integer greater than or equal to 1 and less than or equal to N, a quantity of the significant bits in the $M^{th}$ data frame is less than a quantity of bits in the $M^{th}$ data frame, and remaining bits other than the significant bits in the $M^{th}$ data frame are insignificant bits in the $M^{th}$ data frame; and
wherein the sending the significant bits in the $N^{th}$ data frame, and skipping sending the insignificant bits in the $N^{th}$ data frame comprise:
sending the significant bits in the $N^{th}$ data frame and the significant bits in the $M^{th}$ data frame, and skipping sending the insignificant bits in the $N^{th}$ data frame and the insignificant bits in the $M^{th}$ data frame.

19. The non-transitory computer readable medium according to claim 18, wherein the significant bits in the data frame are bits, corresponding to preset distortion information, in the data frame.

20. The non-transitory computer readable medium according to claim 19, wherein the $N^{th}$ data frame is the first frame, wherein M=N=1; or the $N^{th}$ data frame is not the first frame, wherein M<N and 1≤N−M≤7.

* * * * *